(12) United States Patent
Skoler

(10) Patent No.: US 10,796,326 B2
(45) Date of Patent: Oct. 6, 2020

(54) CONSUMER GAME

(71) Applicant: TRANSFORM SR BRANDS LLC, Hoffman Estates, IL (US)

(72) Inventor: Frederick W. Skoler, Barrington, IL (US)

(73) Assignee: TRANSFORM SR BRANDS LLC, Hoffman Estates, IL (US)

( * ) Notice: Subject to any disclaimer, the term of this patent is extended or adjusted under 35 U.S.C. 154(b) by 243 days.

(21) Appl. No.: 14/148,042

(22) Filed: Jan. 6, 2014

(65) Prior Publication Data

US 2015/0194007 A1    Jul. 9, 2015

(51) Int. Cl.
*G06Q 30/00* (2012.01)
*G06Q 30/02* (2012.01)
*G07F 17/32* (2006.01)

(52) U.S. Cl.
CPC ....... *G06Q 30/0211* (2013.01); *G07F 17/329* (2013.01); *G07F 17/3218* (2013.01); *G07F 17/3232* (2013.01); *G07F 17/3255* (2013.01)

(58) Field of Classification Search
CPC ............... G07F 17/329; G07F 17/3218; G07F 17/3232; G07F 17/3255; G06Q 30/0211
USPC .................................................... 705/14.13
See application file for complete search history.

(56) References Cited

U.S. PATENT DOCUMENTS

| | | | | |
|---|---|---|---|---|
| 6,369,794 B1 * | 4/2002 | Sakurai | ................... | G06F 3/017 |
| | | | | 345/156 |
| 6,636,892 B1 * | 10/2003 | Philyaw | ............ | G06F 17/30876 |
| | | | | 463/17 |
| 7,376,588 B1 | 5/2008 | Gregov et al. | | |
| 8,160,918 B1 * | 4/2012 | Blair | ...................... | G06Q 30/02 |
| | | | | 705/7.32 |
| 8,401,914 B1 | 3/2013 | Kim | | |
| 2004/0015394 A1 * | 1/2004 | Mok | ...................... | G06Q 30/02 |
| | | | | 705/14.31 |
| 2004/0229673 A1 | 11/2004 | Sanders | | |
| 2006/0265238 A1 | 11/2006 | Perrier et al. | | |
| 2007/0013539 A1 * | 1/2007 | Choi | .................... | G10H 1/0091 |
| | | | | 340/671 |
| 2008/0274794 A1 | 11/2008 | Mathieson | | |
| 2010/0257023 A1 | 10/2010 | Kendall et al. | | |
| 2013/0041725 A1 * | 2/2013 | Moore | ............... | G06Q 30/0207 |
| | | | | 705/14.1 |
| 2013/0191213 A1 * | 7/2013 | Beck | .................. | G06Q 30/0267 |
| | | | | 705/14.53 |

FOREIGN PATENT DOCUMENTS

KR    20020052810 A    *    7/2002

OTHER PUBLICATIONS

Bellis, "History of Pinball", updated Apr. 2017, on line at www.thoughtco.com/history-of-pinball-1992320 (Year: 2017).*

(Continued)

*Primary Examiner* — Tarek Elchanti
(74) *Attorney, Agent, or Firm* — McAndrews, Held & Malloy, Ltd.

(57) ABSTRACT

A system and method that engages consumers in a consumer game experience that isolates member preferences and fills in the social graph/personal profile of the consumer, to aid in the targeting of various forms of content to the consumer.

35 Claims, 23 Drawing Sheets

(56) References Cited

OTHER PUBLICATIONS

Mary Story and Simone French, Food Advertising and Marketing Directed at Children and Adolescents in the US, 2004 (Year: 2004).*
Int'l Search Report and Written Opinion for PCT/US2015/010150 dated Apr. 27, 2015 (15 pages).
Canadian Patent Office, Requisition in Application No. 2,935,414, dated Apr. 10, 2018 (3 pages).

* cited by examiner ated with a consumer game, in accor-
CONSUMER GAME

FIELD OF THE INVENTION

Certain embodiments of the present invention relate to systems and methods for capturing personal information about consumers. More specifically, certain aspects of the present invention relate to systems and methods that engage consumers in a consumer game experience that isolates member preferences and fills in the social graph of the consumer, to aid in the targeting of various forms of content to the consumer.

BACKGROUND OF THE INVENTION

Companies wishing to promote products and increase sales attempt to target advertising and promotional content to those consumers with whom the advertising and promotional are most relevant. Businesses involved in retail sales may gather information about potential customers through consumer self-identification (e.g., answers to questionnaires), consumer purchase history information, third party lead generation, subscriber lists for specialty magazines, property tax records, motor vehicle registrations, and/or loyalty or affinity cardholder lists.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and method that engages consumers in a consumer game experience that isolates member preferences and fills in the social graph/personal profile of the consumer, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Figure 1:
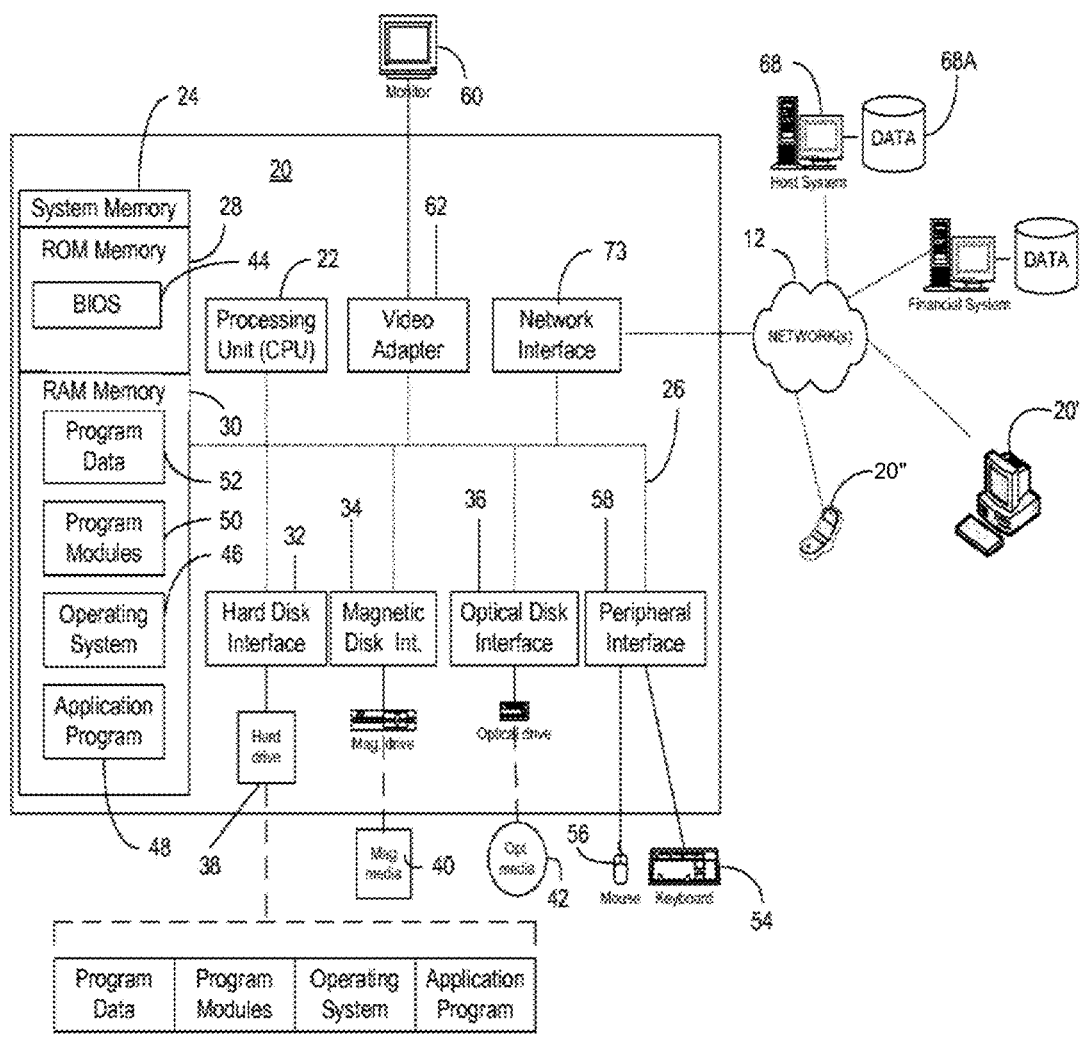
FIG. 1 is an illustration of computer network, in which a representative embodiment of the present invention may be practiced.

Aspects of the present invention relate to systems and methods for capturing personal information about consumers. More specifically, certain aspects of the present invention relate to systems and methods that engage consumers in a consumer game experience that isolates member preferences and fills in the social graph/personal profile of the consumer, to aid in the targeting of various forms of content to the consumer.

The following description of example methods and apparatus is not intended to limit the scope of the description to the precise form or forms detailed herein. Instead the following description is intended to be illustrative so that others may follow its teachings.

In the following discussion, the terms "customer service agent" and "sales associate" may be used herein interchangeably to refer to an employee or other individual who provides product and/or sales related assistance to customers of a business. The sales associate or customer service agent may be, by way of example and not limitation, an expert, question and answer provider, merchandise associate, etc. The terms "customer," "consumer," and "user" may be used herein interchangeably to refer to a potential or existing purchaser of products and/or services of a business.

The term "loyalty program" may be used herein to refer to a structured marketing effort that rewards, and therefore encourages, loyal buying behavior that is potentially beneficial to the business or firm operating or sponsoring the loyalty program. The term "member" may be used herein to refer to those consumers that have provided personal information to an operator or sponsor of a loyalty program in order to gain access to benefits provided by the loyalty program.

The term "social network" may be used herein to refer to a network of family, friends, colleagues, and other personal contacts, or to an online community of such individuals who use a website or other technologies to communicate with each other, share information, resources, etc. The term "social graph" may be used herein to refer to a representation of the personal relationships or connections between individuals in a population.

The term "tag" may be used herein to refer to a label (e.g., a string of characters) attached to or associated with someone or something for the purpose of identification or to give other information (e.g., characteristics of the person or thing, category to which the person or thing belongs, a relationship to other persons or things).

As utilized herein, the terms "exemplary" or "example" means serving as a non-limiting example, instance, or illustration. As utilized herein, the term "e.g." introduces a list of one or more non-limiting examples, instances, or illustrations.

The disclosed methods and systems may be part of an overall shopping experience system created to enhance the consumer shopping event. For example, the disclosed system may be integrated with the customer's reward system, the customer's social network (e.g., the customer can post their shopping activity conducted through the system to their social network), the customer's expert system, digital/mobile applications, shopping history, wish list, location, merchandise selections, or the like. However, the system disclosed may be fully and/or partially integrated with any suitable shopping system as desired, including those not mentioned and/or later designed.

FIG. 1 is an illustration of exemplary computer network in which a representative embodiment of the present invention may be practiced. The following discloses various example systems and methods for, by way of example and not limitation, engaging consumers in a consumer game experience that isolates member preferences and fills in the social graph of the consumer, to aid in the targeting of various forms of content to the consumer. Referring now to FIG. 1, a processing device 20", illustrated in the exemplary form of a mobile communication device, a processing device 20', illustrated in the exemplary form of a computer system, and a processing device 20 illustrated in schematic form, are shown. Each of these devices 20, 20', 20" are provided with executable instructions to, for example, provide a means for a customer, e.g., a user, a customer or consumer, etc., or a sales associate, a customer service agent, and/or others to access a host system 68 and, among other things, be connected to a content management system, an electronic publication system, a hosted social networking site, a user profile, a store directory, and/or a sales associate. Generally, the computer executable instructions reside in program modules which may include routines, programs, objects, components, data structures, etc. that perform particular tasks or implement particular abstract data types. Accordingly, the processing devices 20, 20', 20" illustrated in FIG. 1 may be embodied in any device having the ability to execute instructions such as, by way of example, a personal computer, mainframe computer, personal-digital assistant ("FDA"), cellular telephone, tablet, e-reader, smart phone, or the like. Furthermore, while described and illustrated in the context of a single processing device 20, 20', 20", the various tasks described hereinafter may be practiced in a distributed environment having multiple processing devices linked via a local or wide-area network whereby the executable instructions may be associated with and/or executed by one or more of multiple processing devices.

For performing the various tasks in accordance with the executable instructions, the example processing device 20 includes a processing unit 22 and a system memory 24 which may be linked via a bus 26. Without limitation, the bus 26 may be a memory bus, a peripheral bus, and/or a local bus using any of a variety of bus architectures. As needed for any particular purpose, the system memory 24 may include read only memory (ROM) 28 and/or random access memory (RAM) 30. Additional memory devices may also be made accessible to the processing device 20 by means of, for example, a hard disk drive interface 32, a magnetic disk drive interface 34, and/or an optical disk drive interface 36. As will be understood, these devices, which would be linked to the system bus 26, respectively allow for reading from and writing to a hard disk 38, reading from or writing to a removable magnetic disk 40, and for reading from or writing to a removable optical disk 42, such as a CD/DVD ROM or other optical media. The drive interfaces and their associated computer-readable media allow for the nonvolatile storage of computer-readable instructions, data structures, program modules and other data for the processing device 20. Other types of non-transitory computer-readable media that can store data and/or instructions may be used for this same purpose. Examples of such media devices include, but are not limited to, magnetic cassettes, flash memory cards, digital videodisks, Bernoulli cartridges, random access memories, nano-drives, memory sticks, and other read/write and/or read-only memories.

A number of program modules may be stored in one or more of the memory/media devices. For example, a basic input/output system (BIOS) 44, containing the basic routines that help to transfer information between elements within the processing device 20, such as during start-up, may be stored in ROM 28. Similarly, the RAM 30, hard drive 38, and/or peripheral memory devices may be used to store computer executable instructions comprising an operating system 46, one or more applications programs 48 (such as a Web browser), other program modules 50, and/or program data 52. Still further, computer-executable instructions may be downloaded to one or more of the computing devices as needed, for example via a network connection.

To allow a user to enter commands and information into the processing device 20, input devices such as a keyboard 54 and/or a pointing device 56 are provided. While not illustrated, other input devices may include a microphone, a joystick, a game pad, a scanner, a camera, touchpad, touch screen, etc. These and other input devices are typically connected to the processing unit 22 by means of an interface 58 which, in turn, is coupled to the bus 26. Input devices may be connected to the processor 22 using interfaces such as, for example, a parallel port, game port, FireWire, or a universal serial bus (USB). To view information from the processing device 20, a monitor 60 or other type of display device may also be connected to the bus 26 via an interface, such as a video adapter 62. In addition to the monitor 60, the processing device 20 may also include other peripheral output devices, not shown, such as, for example, speakers, cameras, printers, or other suitable device.

As noted, the processing device 20 may also utilize logical connections to one or more remote processing devices, such as the host system 68 having associated data repository 68A. In this regard, while the host system 68 has been illustrated in the exemplary form of a computer, the host system 68 may, like processing device 20, be any type of device having processing capabilities. Again, the host system 68 need not be implemented as a single device but may be implemented in a manner such that the tasks performed by the host system 68 are distributed amongst a plurality of processing devices/databases located at different geographical locations and linked through a communication network. Additionally, the host system 68 may have logical connections to other third party systems via a network 12, such as, for example, the Internet, LAN, MAN, WAN, cellular network, cloud network, enterprise network, virtual private network, wired and/or wireless network, or other suitable network, and via such connections, will be associated with data repositories that are associated with such other third party systems. Such third party systems may include, without limitation, systems of banking, credit, or other financial institutions, systems of third party providers of goods and/or services, systems of shipping/delivery companies, media content providers, document storage systems, etc.

For performing tasks as needed, the host system 68 may include many or all of the elements described above relative to the processing device 20. In addition, the host system 68 would generally include executable instructions for, among other things, coordinating storage and retrieval of documents; maintaining social network storage of a shopping list; receiving a location of a customer via a mobile device; maintaining maps and layouts of buildings and geographic areas; calculating directions or routes within buildings and geographic areas; searching, retrieving, and analyzing web-based content; managing operating rules and communication with user devices used by participants in a multiplayer consumer game, for receiving a request for a service call center connection from either a customer or a sales associate; routing a received request via a distributed mobile video call center; and providing a service call infrastructure for providing the requestor with a distributed customer service experience.

Communications between the processing device 20 and the host system 68 may be exchanged via a further processing device, such as a network router (not shown), that is responsible for network routing. Communications with the network router may be performed via a network interface component 73. Thus, within such a networked environment, e.g., the Internet, World Wide Web, LAN, cloud, or other like type of wired or wireless network, program modules depicted relative to the processing device 20, or portions thereof, may be stored in the non-transitory computer-readable memory storage device(s) of the host system 68 and processing devices 20, 20' and 20".

A representative embodiment of the present invention may be seen in a system or method for engaging consumers in a consumer game experience that isolates member preferences and fills in the social graph/personal profile of the consumer, to aid in the targeting of various forms of content to the consumer, as further described below.

A consumer game in accordance with a representative embodiment of the present invention may be operated and/or sponsored by a merchant or business, and may be played by a consumer when at a "brick-and-mortar" (i.e., physical) location of the merchant, or when the consumer is at another location, away from a location of the operating and/or sponsoring merchant. The consumer game experience may take place in sessions that have a duration that lasts for a certain amount of time (e.g., 20 minutes). The participants/players in each game session may, for example, be located within a limited geographic region, may include participants within one or more designated locations of the merchant (e.g., only those merchant locations within a particular city or town), or include participants within a specified geographic area (e.g., a section of a retail store, one or more states, provinces, counties, and/or an entire county, continent, or the entire world).

In some representative embodiments of the present invention, all of the participants may take part in a consumer game session together, during a common period of time, without regard to physical location. The frequency and timing of consumer game sessions, and the total value of the pool of prizes to be awarded, may be automatically determined by a system of the operator and/or sponsor of the consumer game, based on the number of participants in game sessions, and business goals of the operator and/or sponsor.

In one representative embodiment of the present invention, the participant may be offered, via the display of a user device such as a mobile telephone or smart phone, a certain number (e.g., five) of product categories from which to choose a single product category with which they will interact during a game session. The product categories offered to the consumer participant may be automatically chosen by a system in accordance with the present invention, based on a personal profile comprising information about the participating consumer. Such information of a personal profile may be collected and maintained by the system, for those consumers that are members of, for example, a loyalty program of the merchant operating or sponsoring the consumer game system.

If the participant finds that they do not like the product categories initially chosen for them by the system, the participant may request a different set of product categories from which to choose the one product category for the coming game session. The request for a different set of product categories may made by, for example, the physical shaking of the user device of the participant, or by swiping a finger across a touch sensitive screen of the user device of the participant. Once a product category has been selected by a participant, the member may then be presented with two or more images and/or text representing products or product offers from the category that they chose, and may be asked to identify their relationship with or their preference for a user-selected one of the represented products or product offers, by attaching to or associating with the image or text representative of the selected product, an icon or text label indicating whether the participant, for example, "likes," "wants," or "has" the selected product. In a representative embodiment of the present invention, the participant may then be awarded a benefit such as, for example, an entry in a sweepstakes or contest, based upon their completion of selection of a preferred product.

In a representative embodiment of the present invention, the participant in the game may collect additional entries in the sweepstakes in various ways. For example, in one representative embodiment of the present invention, the system may cause a set of a certain number of icons, images, or pieces of text to be displayed (e.g., nine) on the screen of a user device that may be related to or have meaning in regard to the product selected by the game participant. Such icons, images, or pieces of text may be referred to herein as "tags" or "dots." In a representative embodiment of the present invention, the tags or dots may be animated in a way to adjust participant "tension" in the dynamics of playing the game. The consumer game participant may tap or select those "dots" that the user feels best represent their feelings about or relationship to the product they selected. In a representative embodiment of the present invention, after a "dot" is selected by the participant from a displayed set of "dots," that "dot" may be removed from those available for selection. After the game participant has selected a certain number of "dots," (e.g., five), the game participant may be awarded an additional entry in the sweepstakes. A representative embodiment of the present invention may serve or present various "dots" to the participant based on, for example, the depth of the member's personal profile information and any detected gaps or deficiencies in the personal profile information that are in context with or related to the product selected by the participant. While "dots" that are not selected may displayed as part of two or more sets of "dots," a "dot" may not be displayed again once it has been selected by the participant.

In some representative embodiments of the present invention, the user may be awarded an additional entry in the sweepstakes upon completion of a designated "task." Such a task may include, for example, a participant employing functionality integrated within or added to their user device (e.g., image capture or wireless communication capabilities that are part of or added to a smart phone, a media player, a cell phone, or any other suitable electronic user device) to scan an optical code (e.g., a two-dimensional code such as a QR code or bar code) or an electronic identification device (e.g., a near-field communication ("NFC") device, a radio frequency identification device ("RFID"), or any other such device known now or in the future). Such optical codes or electronic ID devices may be located in a place in a merchant or business location that is representative of the category of products that the participant originally selected for their game session.

A representative embodiment of the present invention may develop what may be referred to as a "dots profile map," in coordination with behavioral and data science. As described herein above, "dots" may be served to the game participant via the user device, based on information contained with the personal profile of the participant, and the served "dots" may then be selected by the participant. Information about the "dots" selected by the participant may then be fed back into the personal profile information for the participant that is collected and maintained by a system such as the host system 68 of FIG. 1, in accordance with the present invention. In a representative embodiment of the present invention, the "dots profile map" or "profile map" may be created using, by way of example and not limitation, information from a personal profile and/or social graph of a user that may include the user's age, any demonstrated (e.g., from web browsing history) or expressed (e.g., from consumer questionnaires) product category interests, a life-stage of the user (e.g., college student, newly-wed, parent, elderly or retired, home-owner, etc.), user purchase history, basic needs, aspirational goals, delight, and satisfaction.

In a representative embodiment of the present invention, information from such a personal profile and/or social graph of a user, and known purchasing behaviors and interests for a larger population of consumers at various life stages (e.g., derived from historical information for interactions with consumers served by the merchant or business operating or sponsoring a system of the present invention, or other sources) may be used to identify aspects or attributes of the personal profile or portions of the social graph of the user for which insufficient information may be present. For example, for a given user, an estimate of the life stage of the user may be made based on a number of user attributes including, for example, purchase history, web browsing history, results of consumer questionnaires, and other factors for the given user, when compared with the same attributes for various life stages of the larger population. Once an estimated or potential life stage is identified for the given user based upon the attribute information available in the social graph/personal profile of the given user, a representative embodiment of the present invention may then evaluate the known attribute information in the personal profile and/or social graph of the given user, in light of the more complete set of attributes for the known purchasing behaviors and interests of a much larger population of consumers that are in the estimated or potential life stage of the given user. In this way, any gaps or deficiencies in what is known about specific aspects or attributes of the given user and what is known about the same aspects or attributes of a larger population of users at what may be assumed to be the same life stage as the given user, can be assessed. A representative embodiment of the present invention may then select tags or "dots" related to those aspects or attributes in which gaps or deficiencies in knowledge about the given user exist. The selected tags or "dots" may then be served/presented to the given user during the consumer game for selection by the given user. The responses/selections by the given user to the served/presented tags or "dots" may then be used to help fill in those aspects or attributes of the personal profile and/or social graph of the given user that are considered to have gaps or deficiencies. It should be noted that the social graph and/or personal profile of a user may reside in any suitable storage medium located within a computer network or system such as, for example, the computer network 100, including host system 68, data repository/database 68A, and any storage functionality of processing devices 20, 20', 20" of FIG. 1.

In a representative embodiment of the present invention, game participants may compete to receive chances in a sweepstakes that awards, by way of example and not limitation, "points," "reward points," "credits," "coupons" or other forms of value to the winner of the sweepstakes. The award to the winner may only be redeemable in the product category selected by the participant and in which the participant is playing. Consumers that participate in the game while at a location of the merchant operating or sponsoring the consumer game, and who successfully perform certain actions (e.g., scan an optical or electronic identification device, or upload a photo) while in-store, may be awarded additional entries in the sweepstakes.

In some representative embodiments of the present invention, all participants in the consumer game may receive, for example, an offer of one of a number of forms. For example, the participant may receive a time sensitive promotional offer, which may be specifically created or selected for the participant based upon the "dots" applied to the product selected by the participant during, for example, the consumer game session described above. The terms and conditions for the offer provided to the participant may permit the offer to only be used in-store, or to only be used online (e.g., via the Internet), or to be used either in-store or online, and may limit use of the offer to the purchase of product(s) and/or service(s) in or related to the product category selected by the participant.

The in-store experience puts the member in the location of the products and may send to him/her a coupon that can be used immediately. After considering a product they may want for an extended period of time in the "virtual space" of consumer game the option to buy a product selected by the participant may be extremely attractive.

FIGS. 2A-2E are a flowchart illustrating an exemplary method that supports a user participation in a consumer game, in accordance with a representative embodiment of the present invention. The following discussion of the various actions described in FIGS. 2A-2E may be performed by various elements of the system described above with respect to FIG. 1. For example, in some representative embodiments of the present invention, the actions of the various portions of FIGS. 2A-2E may be performed by a system such as the host system 68 communicating via the a network with a browser application running on a user device such as any of processing devices 20, 20', 20". In another representative embodiment of the present invention, portions of the actions described with respect to FIGS. 2A-2E may be performed by what may be referred to herein as an application, "app," or "mobile app" installed on a user device (e.g., one of processing devices 20, 20', 20") by the user, while other portions of the actions of FIGS. 2A-2E may be performed by one or more processors of other element of a system such as that shown in FIG. 1.

Figure 2A:
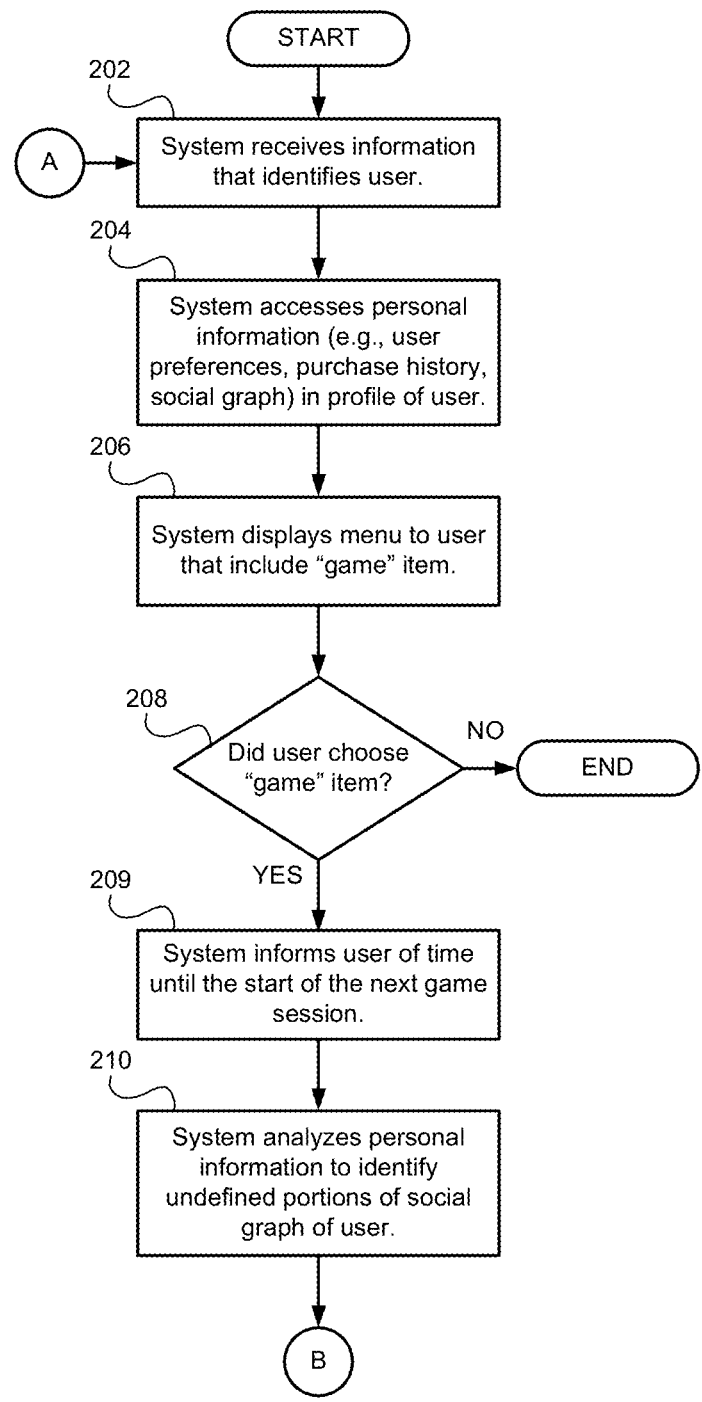
FIGS. 2A-2E are a flowchart illustrating an exemplary method that supports a user participation in a consumer game, in accordance with a representative embodiment of the present invention.
Figure 2B:
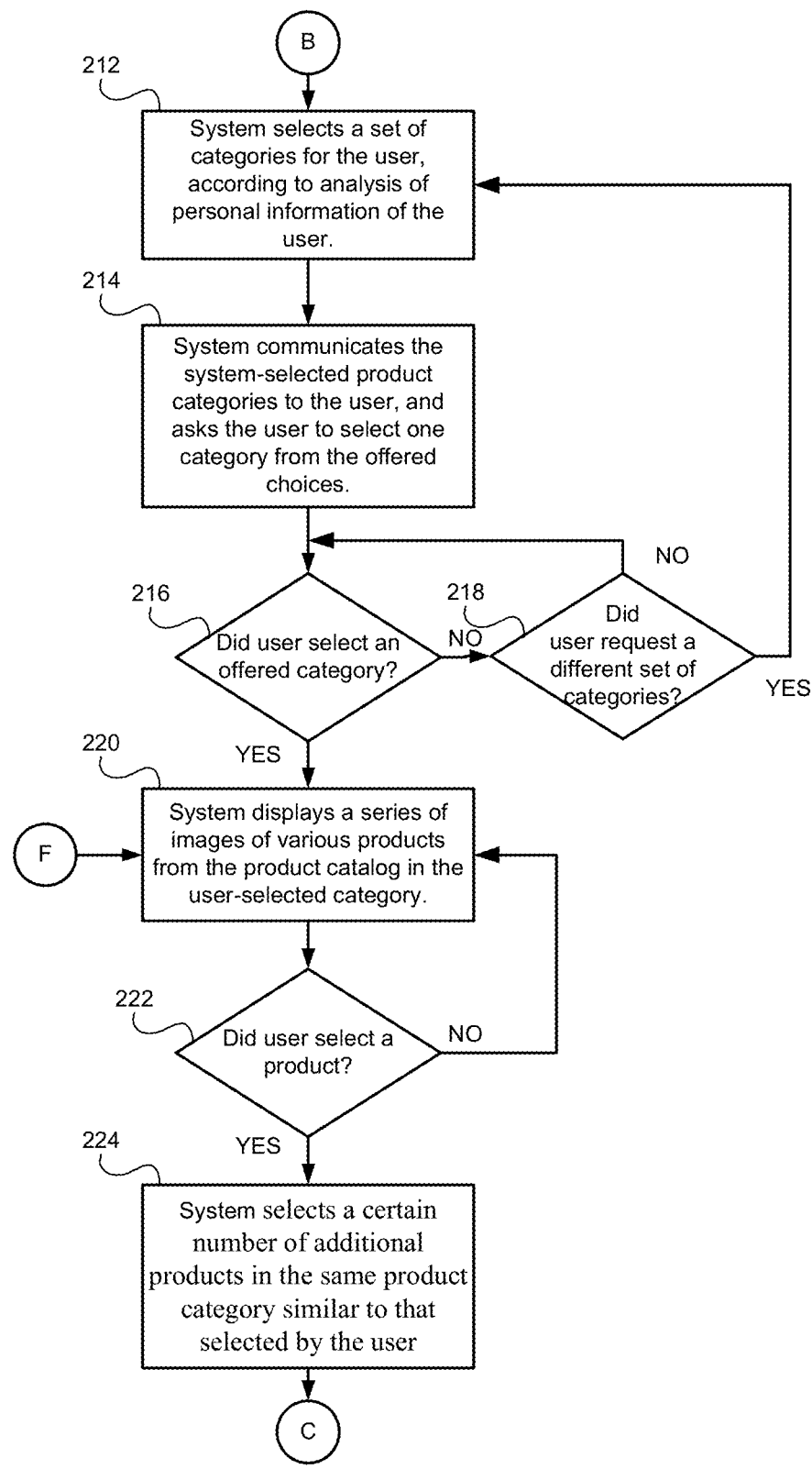
Figure 2C:
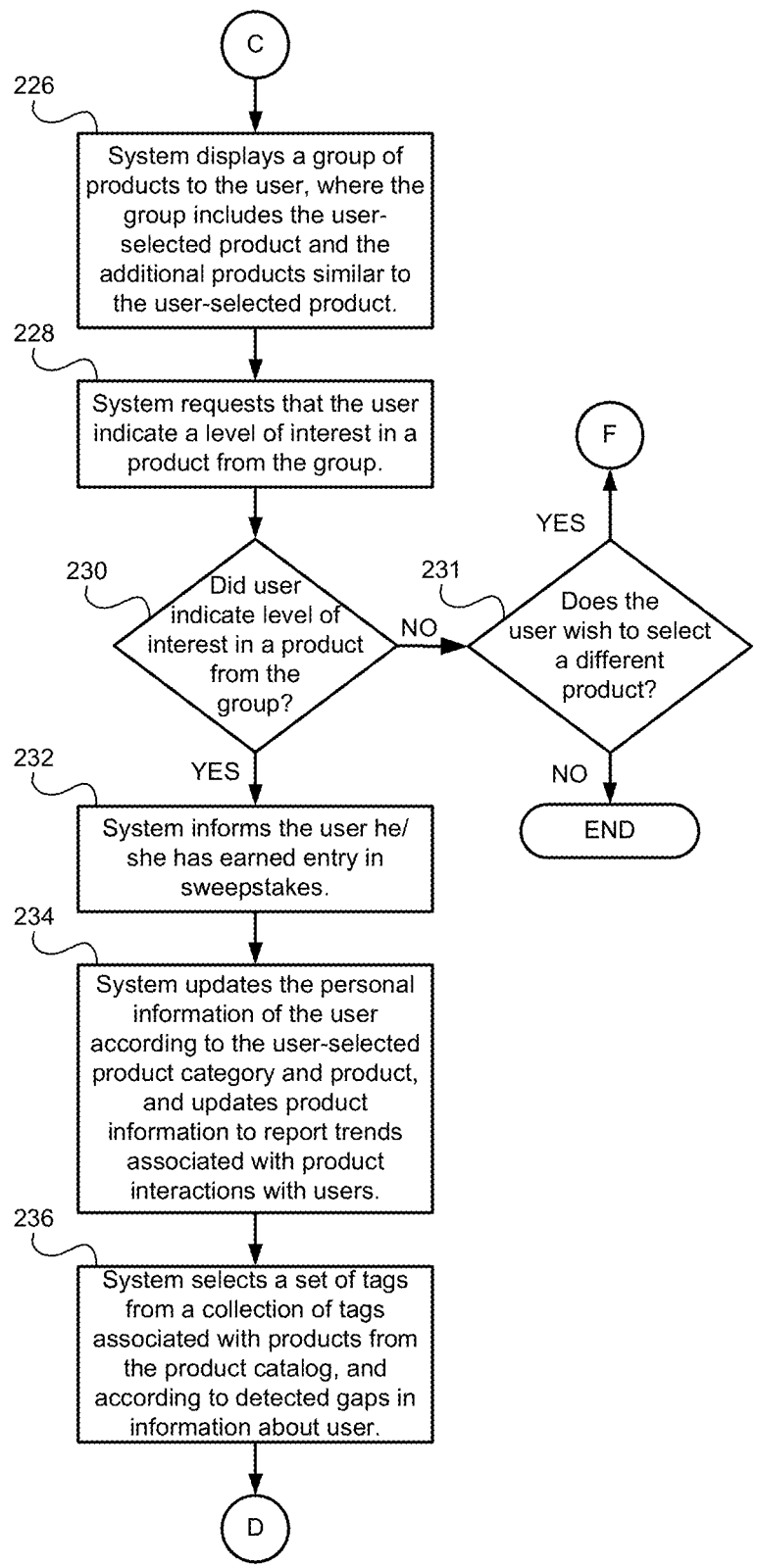
Figure 2D:
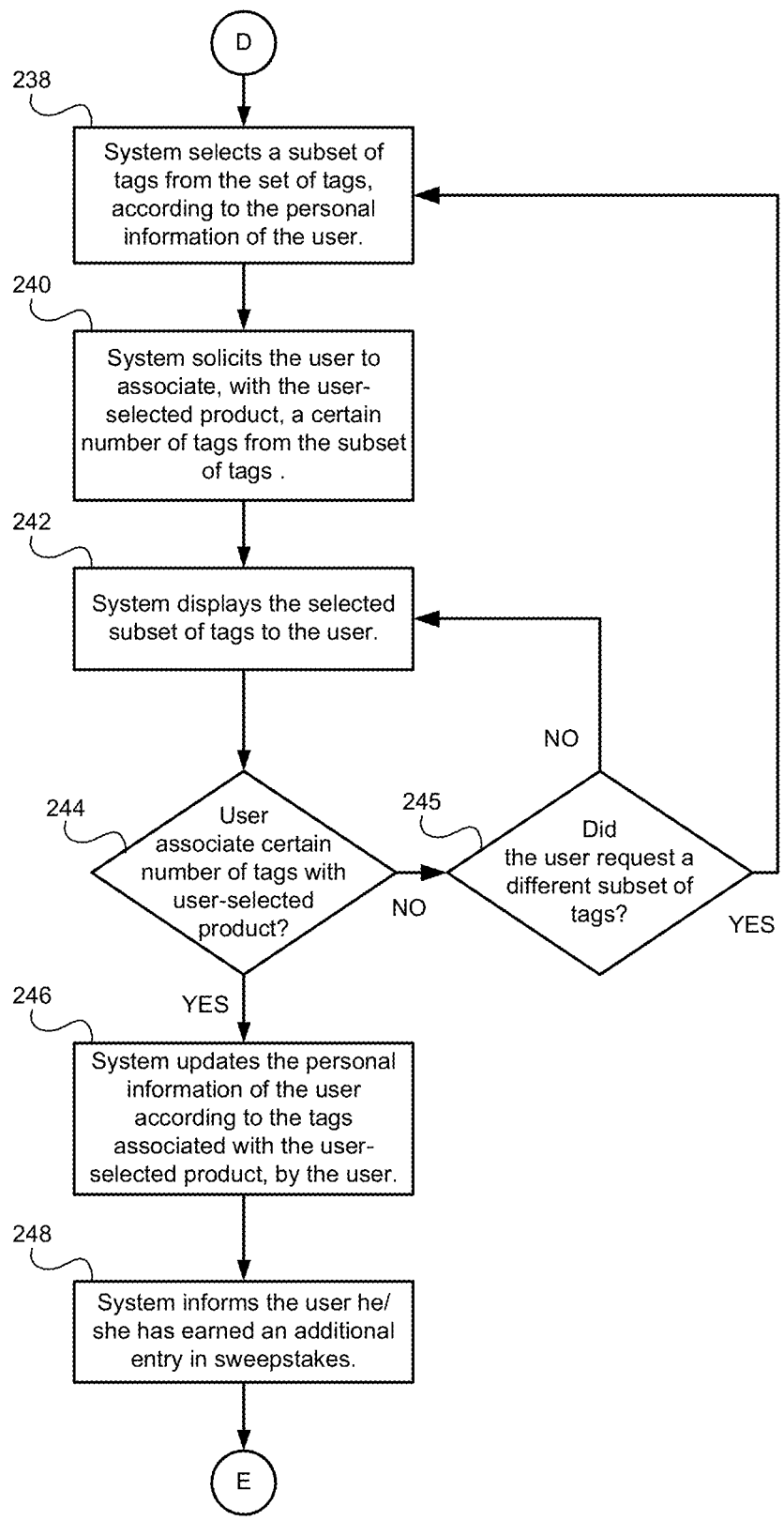
Figure 2E:
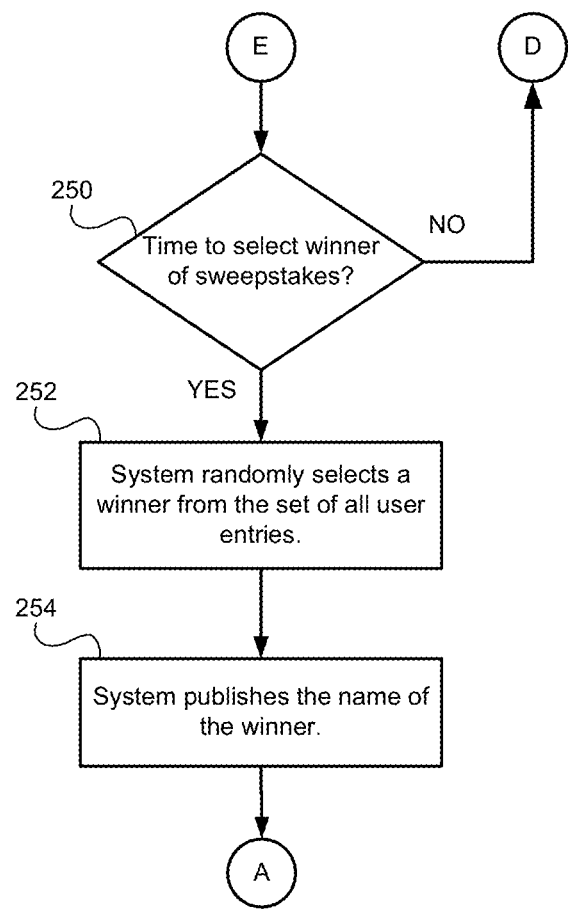
Figure 4:
FIG. 4 illustrates an exemplary screen image showing information about a user-selected business location of a merchant, in accordance with a representative embodiment of the present invention.

The method of FIGS. 2A-2E begins at block 202 of FIG. 2A, where a system such as the host system 68 of FIG. 1 receives information that identifies a user of a device such as one of the processing devices 20, 20', 20" of FIG. 1. Such information may be received by the system when, for example, a user of a user device such as, by way of example and not limitation, a cell phone; a smart phone; a tablet, laptop, or desktop computer; or a media player, starts an application or "app" that interacts with the host system 68. The use of such an application may be limited to consumers that are member of a loyalty program operated by or for the merchant that operates or sponsors the system of FIG. 1 and the consumer game. In some representative embodiments of the present invention, the application may have an option for the user to indicate that they wish to associate their current activities using the application with a particular business location of the merchant that operates or sponsors the system. This association of the user's activities with a particular location of the merchant may be referred to herein as "Shop'in," and may result in the display, by the application, of information about the particular merchant location at which the user chooses to "Shop'in." In some representative embodiments of the present invention, the display of information about the merchant location may include information about the status of the consumer game and, in particular, may provide information about the number of users that have won while in "Shop'in" status at the particular merchant location. An example of a screen image showing such information is illustrated in FIG. 4, discussed below.

Information about the user, including information identifying the user, information identifying personal preferences of the user, and information identifying user device(s) associated/used by the user, may be collected by the system during enrollment of the user as a member of a loyalty program and/or during installation of an application or "app" on a user device. Such information about the user may be made part of a personal profile of the user that is maintained by the system. The personal profile of the user may also be associated with or used as a repository of other information including, but not limited to, a business location of the merchant at which the user prefers or is currently in "Shop'in" status, historical information tracking various transactions (e.g., purchases, returns, contacts with sales associates) by the user, and information about individuals with whom the user is related or interacts socially (i.e., a "social graph") and their relationships with the user.

Next, at block 204, the system performing the method may access personal information about the user such as, by way of example and not limitation, personal preferences (e.g., maker, product, brand, designer, color, size, merchant location, delivery address), purchase history, and a social graph representative of the relationships of the user with others. Then, at block 206, the system may display a menu to the user on a display of the user device. In a representative embodiment of the present invention, the menu may include a menu item that identifies a "consumer game" as one possible user option for selection, and such a menu item may only be displayed if the user has chosen a particular business location of the merchant operating or sponsoring the game that they want as the merchant location with which they prefer or wish to be associated (i.e., the user is in "Shop'in" mode).

Next, at block 208, the system determines whether the user has chosen the "consumer game" option of the menu. If the user does not select the "consumer game" menu item, the method of FIGS. 2A-2E ends, as the method of FIGS. 2A-2E does not address actions of any of the many other menu choices that may be offered. If, however, at block 208, it is determined that the user selected the "consumer game" menu item, the method of FIG. 2A continues at block 209, where the system performing the method may inform the user of the start of the next game session. Then, at block 210, the method may analyze the personal information of the user (e.g., information in the personal profile) to identify portions of the social graph of the user that are undefined, or other areas of information about the user that are determined to be at less than a certain desirable level of depth.

In a representative embodiment of the present invention, all data collected about a consumer (e.g., information about purchases by the consumer, information provided by the consumer through questionnaires, consumer web browsing behavior, and other sources) may be collected at a central repository, where it is communicated through various interfaces to a software platform/system (e.g., the host system 68 of FIG. 1) that maintains social network information, social graph, and/or personal profile details. As details about a consumer are collected through interactions by the consumer with an application such as that described above, the details are absorbed by the platform/system through an interface that also provides a bi-directional flow of information. What may be referred to herein as a "scorecard," that may be developed by a business or merchant operating or sponsoring a platform/system of the present invention, may include information that indicates which details about the consumer are most important at any point in time. This "scorecard" may be used to guide the selection of data at various stages of the user's relationship with the platform/system including, for example, the selection of tags or "dots" to be presented/served to a user during the consumer game. As more information about the consumer is collected, the consumer game may be provided with targeting details that trigger the presentation to the consumer of tags or "dots" around pools or groups of "dots" associated with the product or service the user selected. Tags may be assigned prior to the consumer game session, but may be altered based on the flow of information during the consumer game session. The information included in the "scorecard" may establish the priority of what associated tags or "dots" are served to the participant during the consumer game. The logic of this may, for example, be defined based on a set of business rules linking back to the "scorecard."

The system performing the method of FIGS. 2A-2E then, at block 212, selects a set of categories to be offered to the user as possible choices with which to interact during the consumer game. In a representative embodiment of the present invention, some of the categories may be categories of products of a product catalog (e.g., of the merchant operating or sponsoring the system supporting the consumer game). The product categories may be selected by the system according to the analysis of the personal information of the user, including any identified undefined portions of the social graph of the user or other areas of information about the user that have been determined to be at less than a certain level of depth. The selection of categories may take into account the length of time that the user has been a member of a loyalty program of the merchant operating or sponsoring the consumer game. For example, for users that have been a member of the loyalty program for less than a certain amount of time, the categories may be selected based on a number of visits by the user to a location of the merchant, for example, on the day of, and/or the day prior to user participation in the consumer game. For those users that have been members of the loyalty program for at least the certain amount of time, the selection of categories may, for example, be based upon historical information identifying the user's browsing history of the website of the merchant.

In a representative embodiment of the present invention, the set of product categories selected may be limited to a certain number of product categories, and the user may be offered a "deals" category in addition to a number of product categories from which the user may select one category for the consumer game.

Next, at block 214, the system communicates the set of categories for the consumer game (i.e., both system selected product categories, and a "Deals" category, if offered) to the user, and asks the user to select one category from the offered choices. In some representative embodiment of the present invention, the categories may be shown as text within "dots" as illustrated, for example, in FIG. 7, which is discussed in further detail, below. Other visual ways of presenting the categories may include, by way of example and not limitation, a list of category names or descriptions, and graphical representations, such as one or more images. Then, at block 216, the method determines whether the user selected one of the offered categories. If it is determined, at block 216, that the user did select one of the offered categories, the method then continues at block 220, described below. If, however, it is determined at block 216 that the user did not select one of the offered categories, then, at block 218, the method determines whether the user requested a different set of categories than those offered. In a representative embodiment of the present invention, the user may request a different set of categories from which to choose by, for example, shaking the user device (e.g., for those user devices equipped to detect such movement), or by a user finger gesture (e.g., swiping a finger) on the surface of a touch sensitive screen of the user device. If, at block 218, the user did request a different set of categories, the method continues at block 212, described above.

At block 220, if the user selected a product category, the method of FIGS. 2A-2E displays information (e.g., images and/or text) representing various products from the selected product category. If, however, the user selected the "Deals" option, the method may display information (e.g., images and/or text) representing various products that are now a particularly good value (e.g., those that are discounted, or have additional accessories or features not normally available at the offered priced, or a service, or a restaurant discount). The user is asked to select a product or image representing a service from those displayed. The method then waits at block 222 for the user to select a represented product. In a representative embodiment of the present invention, the user may be enabled to access information about each of the represented products or services, and may be permitted to purchase the product or service through the user interface of the consumer game, if they so choose.

Figure 9:
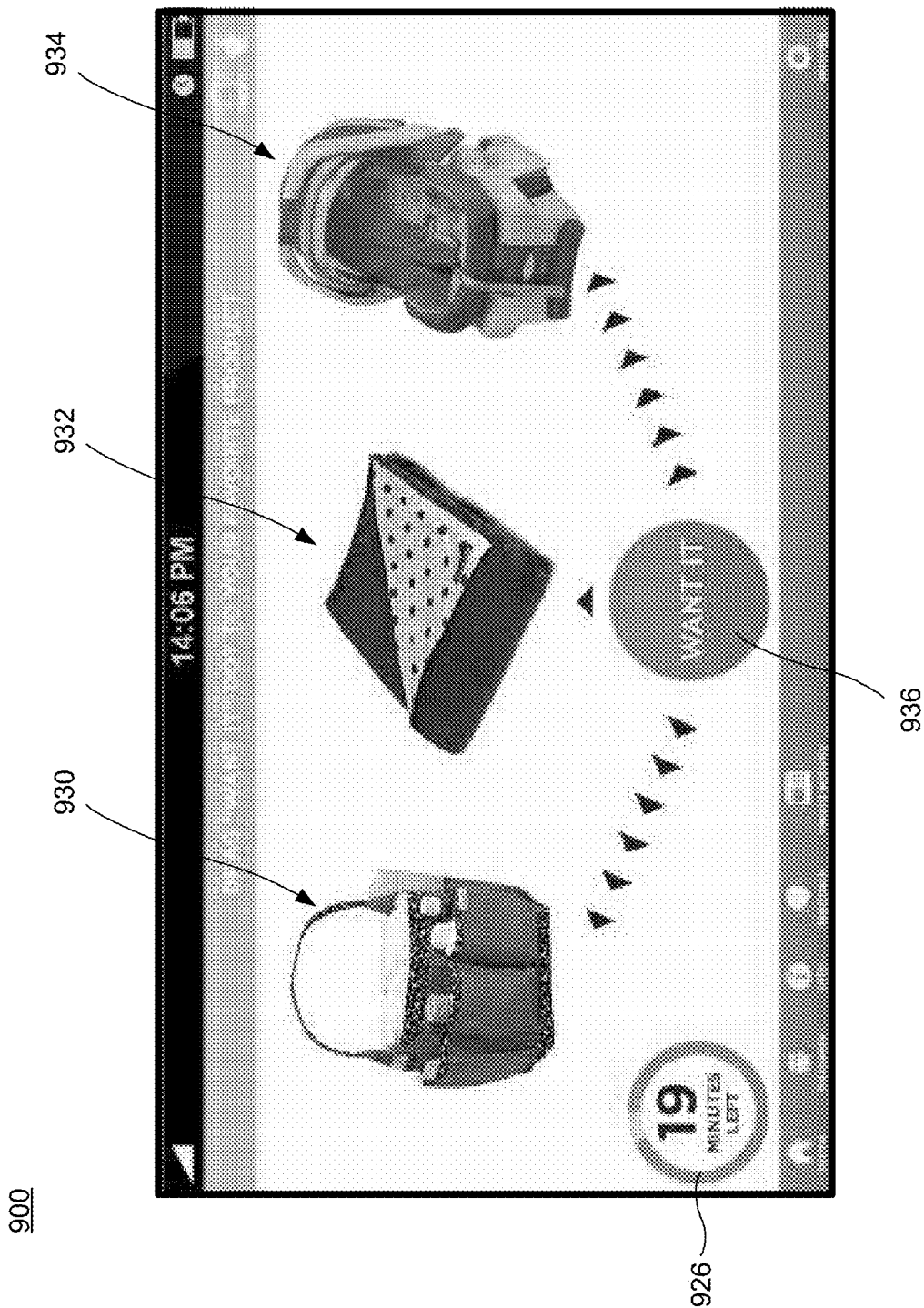
FIG. 9 illustrates an exemplary screen image showing a number of different products that have been automatically selected for a user by a system based upon a product category chosen by the user and personal information of the user, in accordance with a representative embodiment of the present invention.
Figure 10:
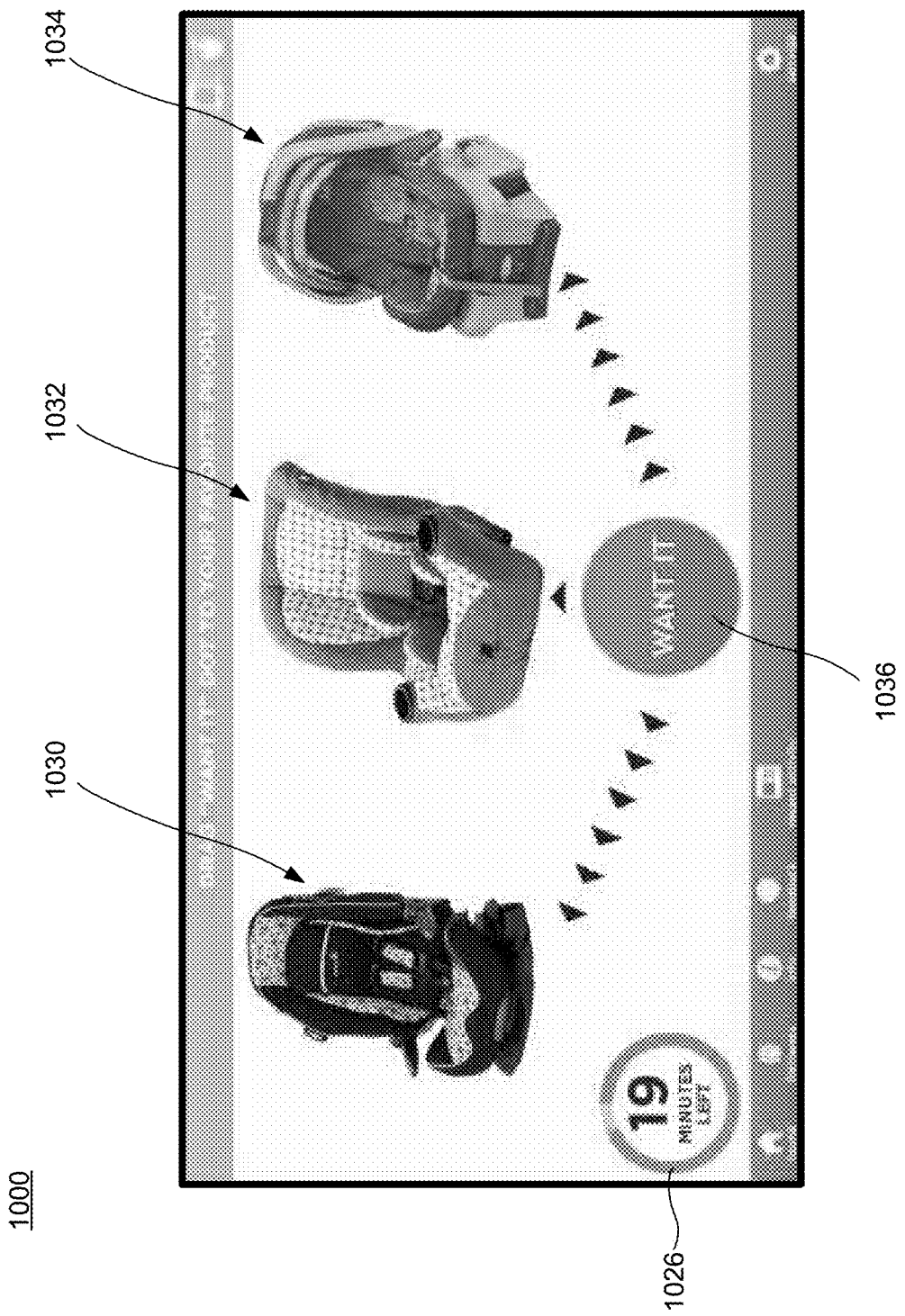
FIG. 10 illustrates another exemplary screen image showing a number of different products that have been automatically selected for a user by a system based upon a product category chosen by the user and personal information of the user, in accordance with a representative embodiment of the present invention.

When the user has selected a product from those presented, the method of FIGS. 2A-2E continues at block 224, where the system performing the method either selects from the product catalog a certain number of products in the same product category that are similar to that selected by the user (e.g., if the user selected a product category), or selects a certain number of deals from the currently available "deals" (e.g., if the user selected the "Deals" option). Next, at block 226, the system performing the method displays a group of products to the user, where the group includes the user-selected product and the additional products similar to the user-selected product that were selected by the system. The method then, at block 228, asks that the user indicate a level of interest in, relationship with, or preference for one of the displayed products. This may be accomplished by, for example, presenting the user with several levels of interest in or a relationship with the product such as, for example, "Like," "Want," and "Have", and requesting that the user move an icon representing one of those levels of interest in or relationship with the product over or nearest to the representation (e.g., image and/or text) of the user-selected product. Examples of such an approach are shown in FIG. 9 and FIG. 10, described below.

Next, at block 230, the method of FIGS. 2A-2E determines whether the user has made an indication of a level of interest in or relationship with in the user-selected product. If the user has not provided an indication of their interest in the user-selected product, the method continues at block 231, where a determination is made as to whether the user wishes to select a different product. If, at block 231, it is determined that the user does not wish to select a different product, the method ends. If, however, the user does wish to select a different product, the method continues at block 220, described above. If, at block 230, the user does provide an indication of their level of interest in or relationship with the user-selected product, the method continues at block 232, where the system performing the method informs the user that he/she has earned their initial entry in the sweepstakes. The method may then, at block 234, update the personal information of the user (e.g., the personal profile) according to the user selected product category, product, and level of interest in or relationship with the product, and may update product information to report trends associated with product interactions with the user.

Next, at block 236, the method directs the system to select a set of tags from a collection of tags associated with various products of the product catalog. Such tags may be those associated with products in the product category selected by the user, and/or with detected gaps in information about user as determined by analysis of the personal profile of the user. The method then, at block 238, directs the system to select a subset of tags from the set of tags, according to the personal information of the user. Next at block 240, the method directs the system to solicit the user to associate, with the user-selected product, a certain number of tags from the subset of tags, in order to be awarded an additional entry in the sweepstakes. Then at block 242, displays each of the certain number of tags to the user. In a representative embodiment of the present invention, the certain number of tags displayed to the user may be, for example, nine tags, and such a solicitation and display of the certain number of tags may appear as a collection of "dots," as shown in the example screen image 1500 of FIG. 15, which is described more fully below. The user may then associate with or apply to the image representing the user-selected product, any of the "dots" that the user feels are appropriate. As each tag or "dot" is associated or applied to the representation of the user-selected product, the "dot" may move off-screen, dissipate, vaporize, or disappear, and is not available for selection again. In addition, a representative embodiment of the present invention may inform the user how many tags or "dots" have been applied and/or how many are yet to be applied in order for the user to be awarded an additional entry in the sweepstakes.

Next, at block 244, the method of FIGS. may determine whether the user has associated or applied a certain number of tags or "dots" to the representation of the user-selected product. If it is determined, at block 244, that less than the certain number of tags or "dots" have been associated with the user-selected product, the system then, at block 245, determines whether the user requested a different subset of tags. If it is determined, at block 245, that the user has requested a different subset of tags, the method continues at block 238 of FIG. 2D. In a representative embodiment of the present invention, the user may request a different subset of tags from which to choose by, for example, shaking the user device (e.g., for those user devices equipped to detect such movement), or by a user finger gesture (e.g., swiping a finger) on the surface of a touch sensitive screen of the user device. If it is determined, at block 245, that the user has not requested a different subset of tags, the method continues at block 242, and continues to display any remaining tags or "dots," for user selection. If, however, it is determined at block 244 that at least the certain number of tags or "dots" have been associated with the representation of the user-selected product, the method of FIGS. 2A-2E continues at block 246, where the method directs the system to update the personal information of the user according to the tags or "dots" associated with the user-selected product, by the user. Then, at block 248, the method directs the system to inform the user that they have been awarded an additional entry in the sweepstakes.

Next, at block 250, the method makes a determination as to whether the amount of time for this session of the consumer game has expired, and that it is time to select a winner in the sweepstakes. If is determined that the amount of time for this session of the consumer game has not yet expired, the method of FIGS. 2A-2E continues at block 238, described above. If, however, it is determined that the amount of time for this session of the consumer game has expired, the method of FIGS. 2A-2E continues at block 252, where the system may be directed to randomly select a winner from the set of all user entries. In a representative embodiment of the present invention, selection of the winner of the sweepstakes may be performed by, for example, a prizing engine using information identifying all entries to the consumer game, and the prize to the winner may be, by way of example and not limitation, the product originally selected by the user, an offer usable for the purchase of a product in the product category in which the user chose to play the consumer game, or a number of "reward points" in the loyalty program of the merchant operating or sponsoring the consumer game. Such "reward points" may, in some representative embodiment of the invention, be usable solely for products in the product category that the user selected for the consumer game. All participants in the consumer game may be provided with an offer redeemable at the merchant or a business partner of the merchant, for participating in the consumer game. The method then, at block 254, notifies all participants of the outcome of the consumer game using, for example, one or more of the user interface of the consumer game, the application on the user device, an email, messaging via a social network such as Facebook®, Twitter®, or any other suitable messaging mechanism or technology.

Figure 3:
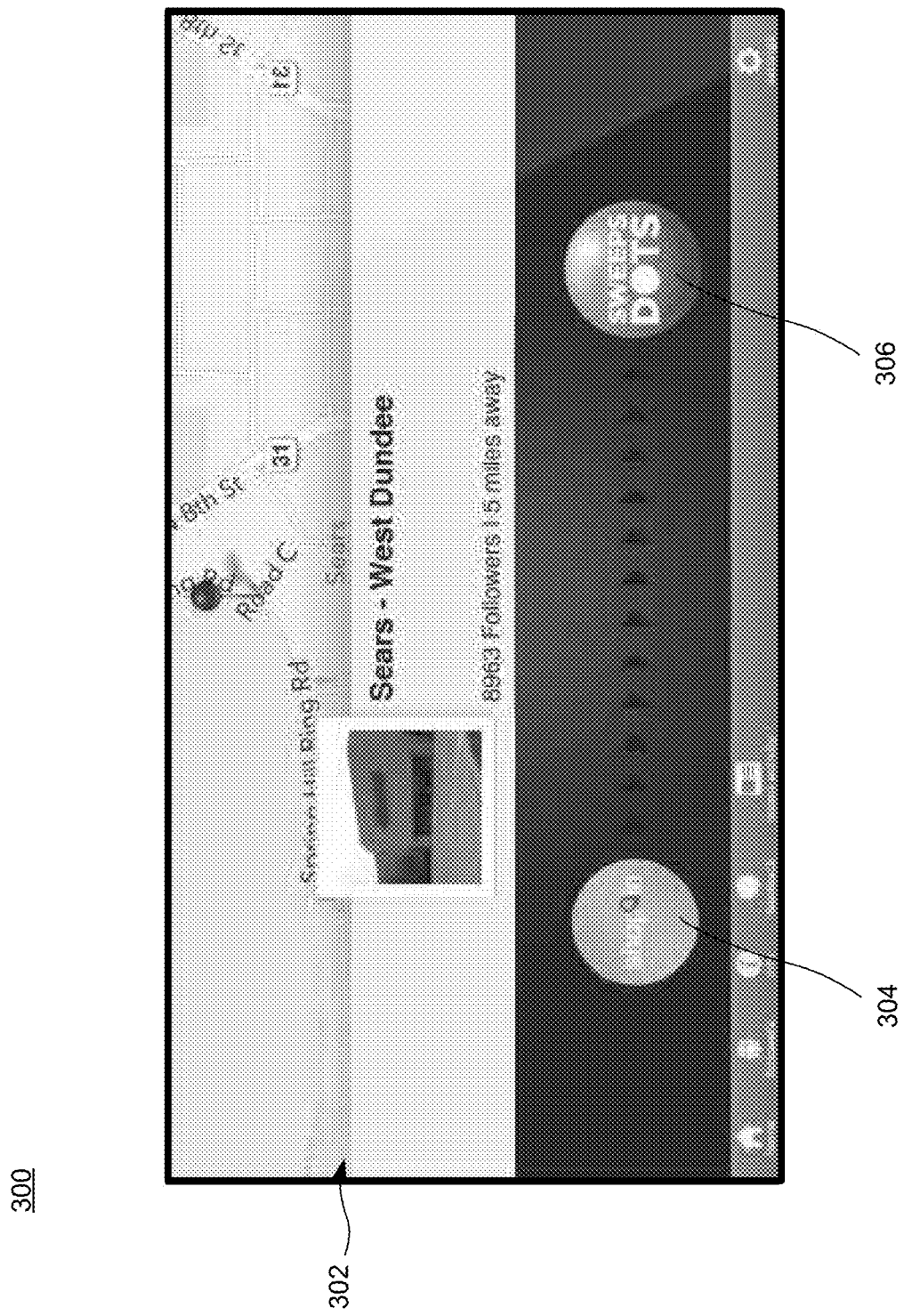
FIG. 3 illustrates an exemplary screen image supporting association of a user with a particular user-selected business location of a merchant, in accordance with a representative embodiment of the present invention.

FIG. 3 illustrates an exemplary screen image 300 supporting association of a user with a particular user-selected business location of a merchant, in accordance with a representative embodiment of the present invention. In one representative embodiment, the user may choose to participate in a consumer game as described above, after indicating a preference for a particular user-selected location of a merchant, by requesting to be associated with the user-selected merchant location. Such an association, which may be referred to herein as "Shop'in," may be with any location of the merchant including, by way of example and not limitation, the merchant location nearest the residence of the user, the merchant location on the user's drive to or nearest the work location of the user, or the merchant location preferred by the user due to the particular products stocked at the merchant location.

The example screen image 300 of FIG. 3 shows merchant information 302 representative of the user-selected business location of the merchant in image and text form. The screen image 300 also includes an icon 304 that signifies that the user is in "Shop'in" mode at the merchant location represented by the merchant information 302. The example shown in FIG. 3 also illustrates a user interface element 306 that, when selected by the user, activates a consumer game for play by the user, in accordance with a representative embodiment of the present invention. It should be noted that the shapes and arrangement of the information and user interface elements of FIG. 3 are for illustrative purposed only, and that other forms of user interface may also be used.

FIG. 4 illustrates an exemplary screen image 400 showing information about a user-selected business location of a merchant, in accordance with a representative embodiment of the present invention. The screen image 400 includes a notification 408 that informs the user of the number of winners of a consumer game at the merchant location with which they have requested to be associated (i.e., with which the user requested to "shop in").

Figure 5:
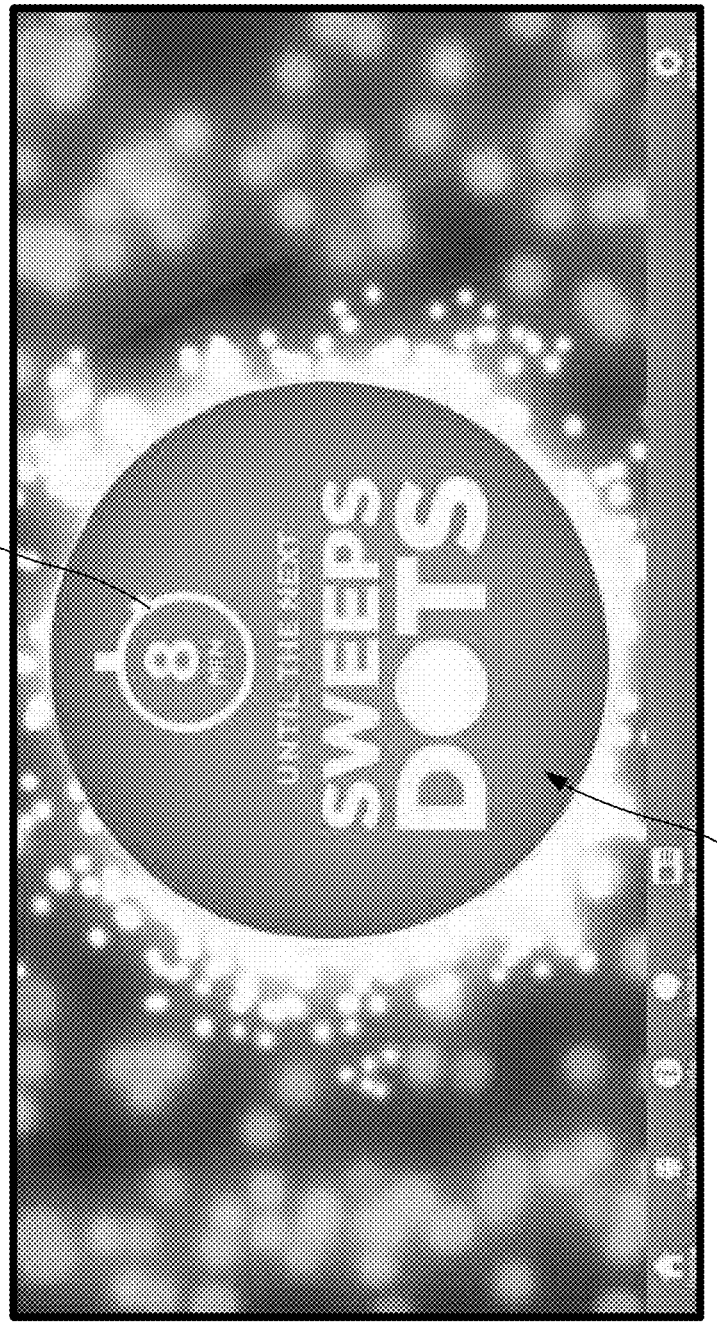
FIG. 5 illustrates an exemplary screen image notifying a user of the amount of time until the start of the next session of a consumer game, in accordance with a representative embodiment of the present invention.

FIG. 5 illustrates an exemplary screen image 500 notifying a user of the amount of time 512 until the start of the next session of a consumer game, in accordance with a representative embodiment of the present invention.

Figure 6:
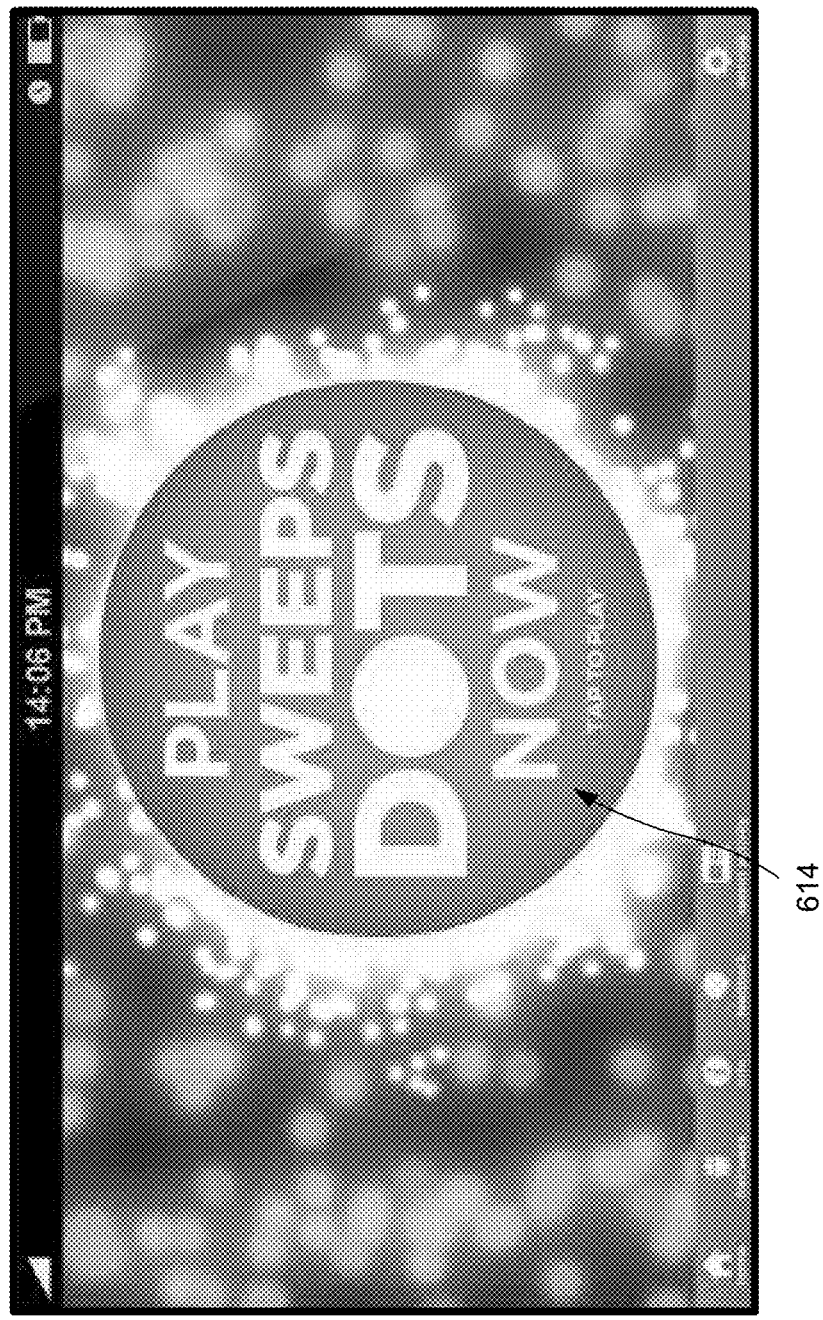
FIG. 6 illustrates an exemplary screen image displaying a notification informing a user of a user device of the opportunity to take part in the current session of a consumer game, in accordance with a representative embodiment of the present invention.
Figure 7:
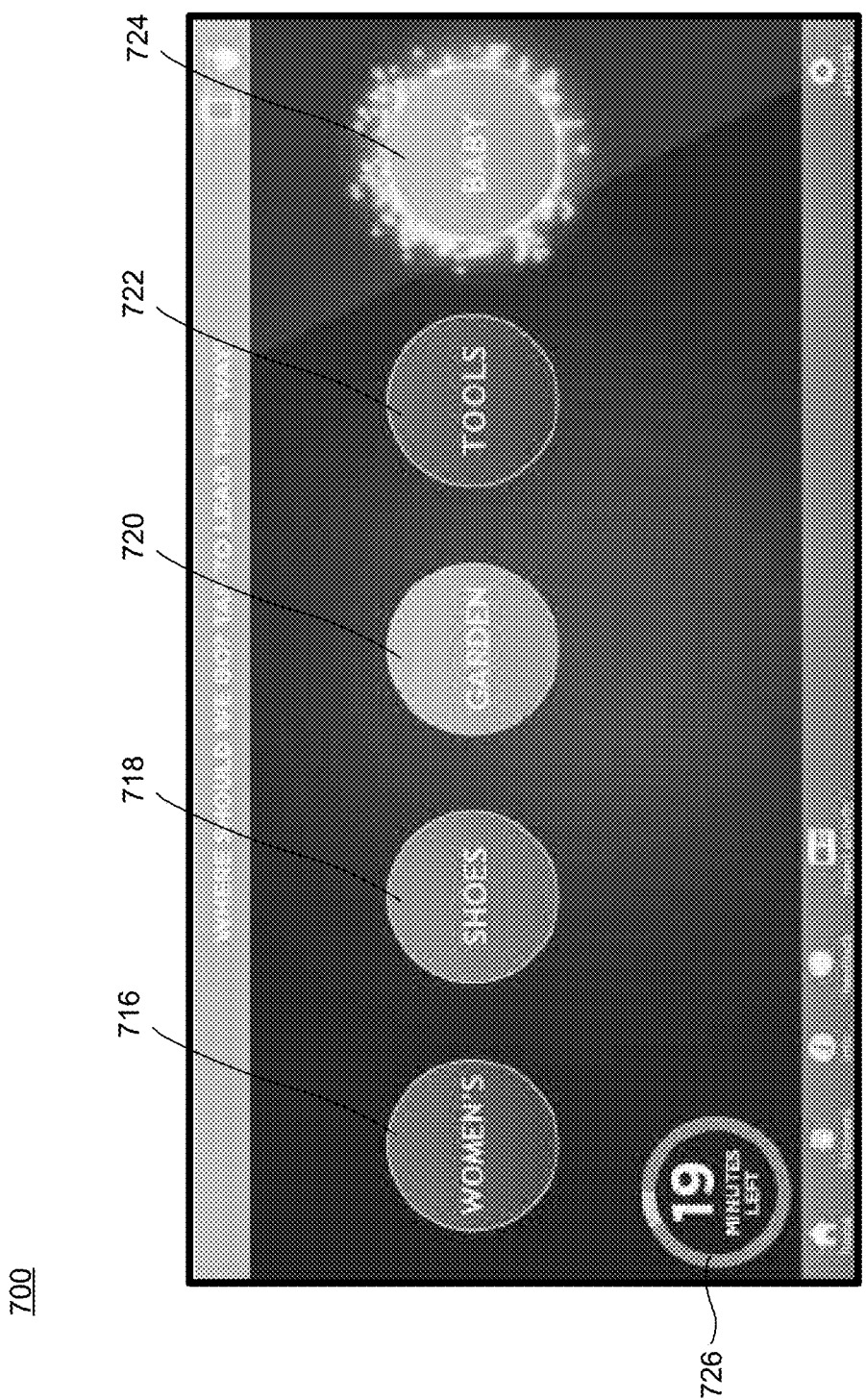
FIG. 7 illustrates an exemplary screen image showing system-selected product categories identified as "Women's", "Shoes", "Garden", "Tools", and "Baby" within which the user may choose to interact during a consumer game session, in accordance with a representative embodiment of the present invention.

FIG. 6 illustrates an exemplary screen image 600 displaying a notification 614 informing a user of a user device of the opportunity to take part in the current session of a consumer game, in accordance with a representative embodiment of the present invention. In one representative embodiment, the participants in the consumer game play during a common game session having a particular duration. As shown in the example of FIG. 6, the user may request to participate in the consumer game session by tapping on a touch-sensitive screen displaying the notification 614. The FIG. 7 illustrates an exemplary screen image 700 showing system-selected product categories identified as "Women's" 716, "Shoes" 718, "Garden" 720, "Tools" 722, and "Baby" 724 within which the user may choose to interact during a consumer game session, in accordance with a representative embodiment of the present invention. Although the illustration of FIG. 7 shows five product category icons 716, 718, 720, 722, 724 represented as static graphical elements with textual identifiers in a specific spatial arrangement, it should be noted that these aspects of FIG. 7 do not represent specific limitations of the present invention, as other ways of offering such choices to the user may be employed without departing from the spirit and scope of the present invention. For example, in some representative embodiments of the present invention, the graphical icons representing the available product categories may be arranged differently, may be of a different shape or size, may include a graphical representation rather than textual information representing the category, and may appear on the viewable area of the screen of the user device individually or in any number and order, to create whatever visual and psychological effects are desired. The icon representing a particular category may also be given special visual effects, such as the special emphasis given to the icon "Baby" 724. The illustration of FIG. 7 also includes time information 726, showing the amount of time left in the current session of the consumer game, to keep the participant informed of how much time is left to play before a winner of the associated sweepstakes is declared.

Figure 8:
FIG. 8 illustrates an exemplary screen image showing a pop-up message 828 displayed during selection of product categories by user, in accordance with a representative embodiment of the present invention.

FIG. 8 illustrates an exemplary screen image 800 showing a pop-up message 828 displayed during selection of product categories by user, in accordance with a representative embodiment of the present invention. As discussed above with respect to FIGS. 2A-2E, a participant in the consumer game may find that a set of product categories selected by a system such as the host system 68 of FIG. 1 may not be relevant to, or of interest to the participant. A system in accordance with a representative embodiment of the present invention may display the pop-up message 828, upon detecting an unusual delay by the user in selecting a product category of greater than a certain amount, or in response to an explicit user action. In response, the participant may perform a particular action with the user device, to request a different set of categories from which to choose. For example, the user may shake the user device, or may perform a particular gesture on a touch sensitive screen using one or more fingers (e.g., a swipe of a finger across the screen surface). The system may then present the user with a new set of categories in the manner described above with respect to FIG. 7.

FIG. 9 illustrates an exemplary screen image 900 showing a number of different products 930, 932, 934 that have been automatically selected for a user by a system based upon a product category chosen by the user and personal information of the user, in accordance with a representative embodiment of the present invention. In a representative embodiment of the present invention, the user may be requested to indicate their favorite one of the displayed products, using an icon 936 representing a particular level of interest (i.e., "Want it"). In a representative embodiment of the present invention, the user may drag the icon 936 to the specific one of the displayed products that the participant considers their favorite. The illustration of FIG. 9 also includes time information 926, to remind the participant of the amount of time remaining before the end of the current session of the consumer game, and selection of a winner in the associated sweepstakes.

FIG. 10 illustrates another exemplary screen image 1000 showing a number of different products 1030, 1032, 1034 that have been automatically selected for a user by a system based upon a product category chosen by the user and personal information of the user, in accordance with a representative embodiment of the present invention. In this representative embodiment of the present invention, the user may be requested to indicate their favorite one of the displayed products, using an icon 1036 representing a particular level of interest (i.e., "Want it"), and may drag the icon 1036 to the specific one of the displayed products that the participant considers their favorite. As in the example of FIG. 9, the example of FIG. 10 also includes time information 1026, to remind the participant of the amount of time remaining before the end of the current session of the consumer game, and selection of a winner in the associated sweepstakes.

Figure 11:
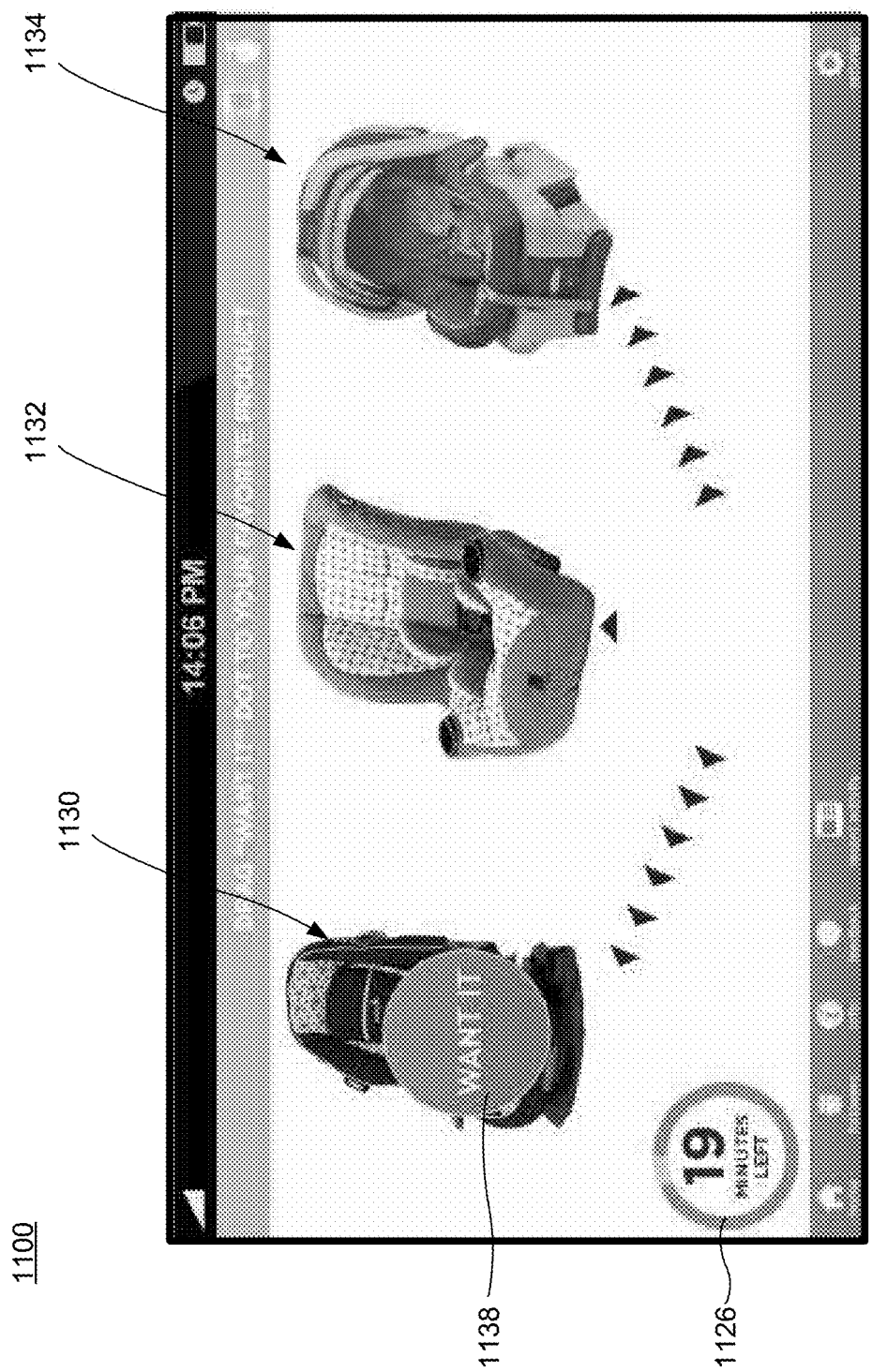
FIG. 11 illustrates an exemplary screen image showing a number of different products that may correspond to, for example, the products of FIG. 10, which have been automatically selected for a user by a system based upon a product category chosen by the user and personal information of the user, in accordance with a representative embodiment of the present invention.

FIG. 11 illustrates an exemplary screen image 1100 showing a number of different products 1130, 1132, 1134 that may correspond to, for example, the products 1030, 1032, 1034 of FIG. 10, which have been automatically selected for a user by a system based upon a product category chosen by the user and personal information of the user, in accordance with a representative embodiment of the present invention. In the example of FIG. 11, the user has dragged the icon 1138 to the specific one of the displayed products that the participant considers their favorite. By doing so, the user has completed selection of a category and a product with which to interact during the consumer game, and has been awarded an initial entry in a sweepstakes associated with the consumer game. As in the example of FIGS. 9 and 10, the example of FIG. 11 includes time information 1126, to remind the participant of the amount of time remaining before the end of the current session of the consumer game, and selection of a winner in the associated sweepstakes.

Figure 12:
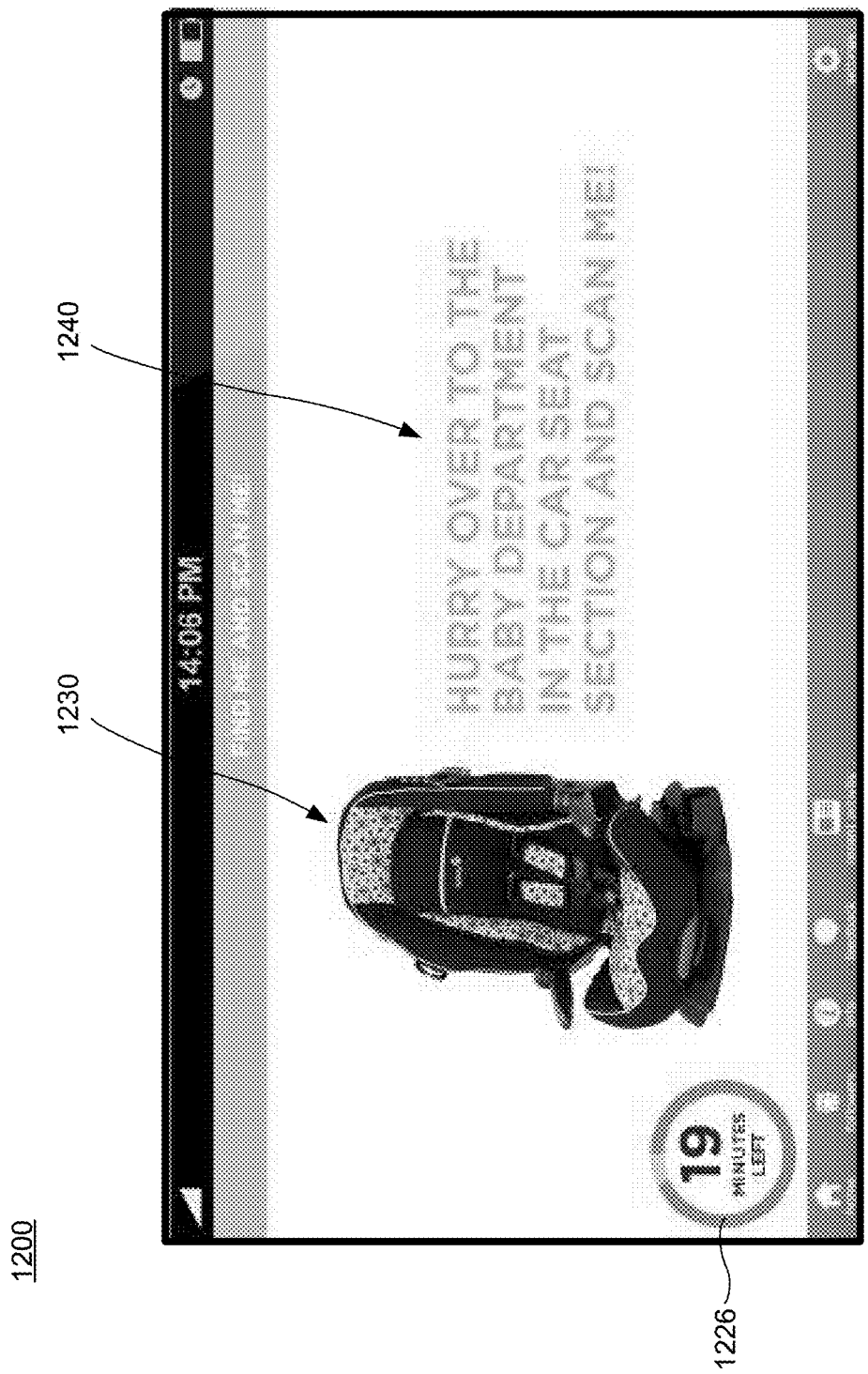
FIG. 12 illustrates an exemplary screen image showing the user-selected product, urging the user to find the user selected product in the merchant location chosen by the user, e.g., using "Shop'in," as described above, in accordance with a representative embodiment of the present invention.

FIG. 12 illustrates an exemplary screen image 1200 showing the user-selected product, urging the user to find the user selected product in the merchant location chosen by the user, e.g., using "shop in," as described above, in accordance with a representative embodiment of the present invention. The represented product 1230 may correspond to the product 1130 of FIG. 11, which the user selected as their favorite, in the manner described above. A system such as, for example, the host system 68 and user device may present the message 1240 to urge the user to find the user-selected product in the area of the merchant location in which the user selected category is located, and to scan information on the product 1230. The user may, for example, scan identifying information such as a bar code (e.g., a UPC label, a QR®), a near field communication device, or an radio frequency ID device using built-in functionality of a user device such as, by way of example and not limitation, a cell phone, a smart phone, and/or a handheld or tablet computer. In a representative embodiment of the present invention, by scanning the user-selected product 1230 in-store, the user may be awarded an additional entry in a sweepstakes associated with the current session of a consumer game. The illustration of FIG. 12 includes time information 1226, to remind the user of the remaining time in the current session of the consumer game.

Figure 13:
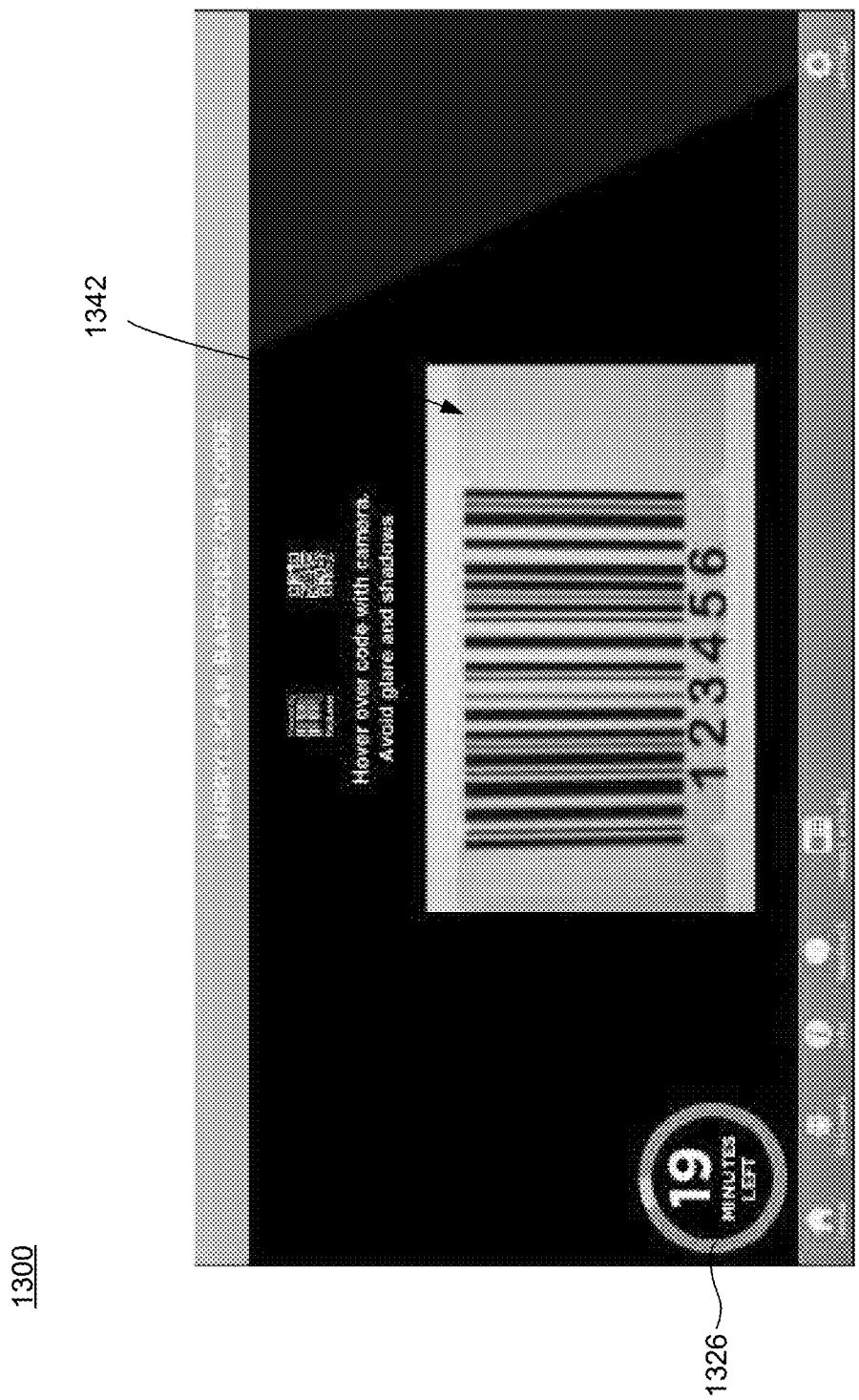
FIG. 13 illustrates an exemplary screen image showing a product bar code captured and displayed by an application running on a user device, in accordance with a representative embodiment of the present invention.

FIG. 13 illustrates an exemplary screen image 1300 showing a product bar code 1342 captured and displayed by an application running on a user device, in accordance with a representative embodiment of the present invention. The information captured by, for example, an imaging device, near field communication interface, or radio frequency identification device interface may be compared with corresponding information for a user-selected product such as, for example, the user-selected product 1230 of FIG. 12. Such corresponding information may be stored in a system such as, for example, the host system 68 and/or the associated database 68A of FIG. 1. If the information captured from the product matches the corresponding information, the user participating in the consumer game may be awarded an additional entry in a sweepstakes associated with the consumer game. In a representative embodiment of the present invention, time information 1326 of FIG. 13 again reminds the user of the urgency to complete various actions, such as those described above, before the end of the current session of the consumer game.

Figure 14:
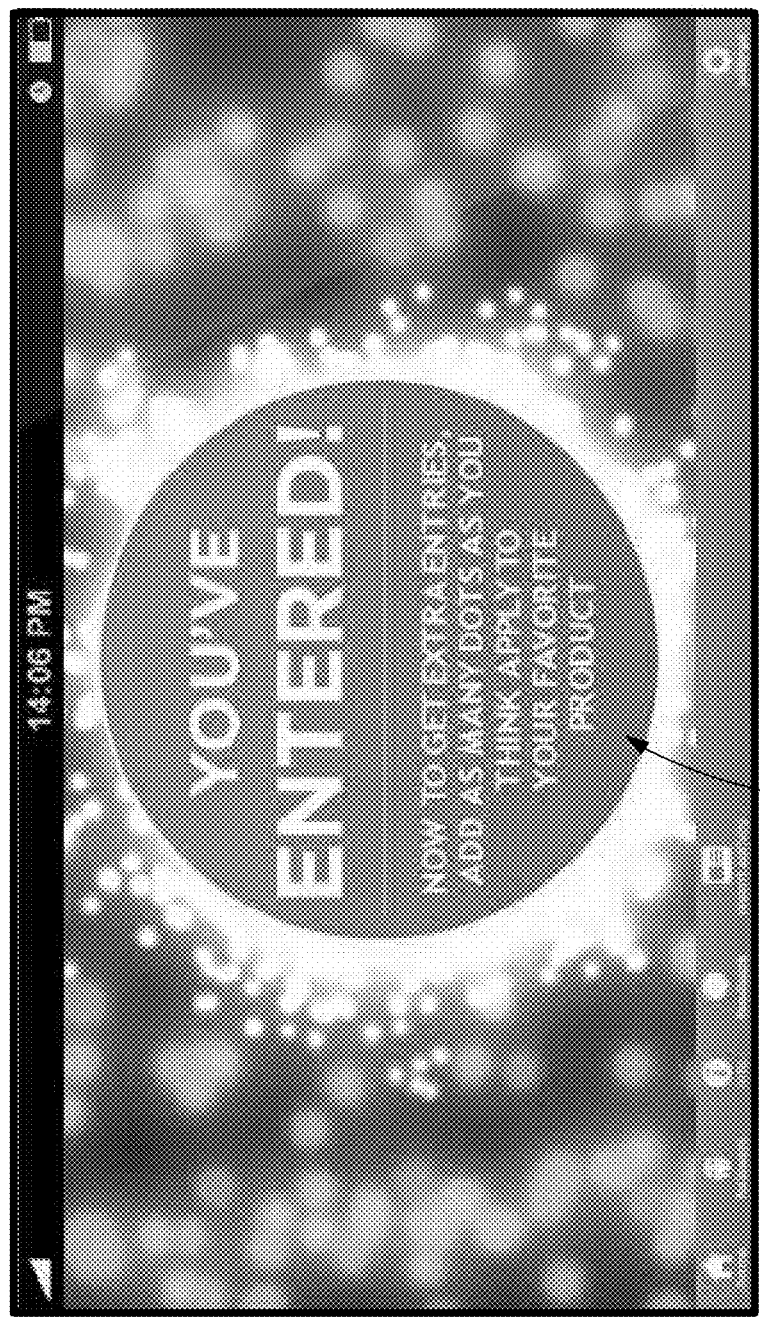
FIG. 14 illustrates an exemplary screen image including a notification message informing a user of their entry in a sweepstakes associated with a consumer game, in accordance with a representative embodiment of the present invention.

FIG. 14 illustrates an exemplary screen image 1400 including a notification message 1444 informing a user of their entry in a sweepstakes associated with a consumer game, in accordance with a representative embodiment of the present invention. The screen image 1400 may, for example, be displayed to a participant in the consumer game upon the consumer selecting a product from a user-selected category.

Figure 15:
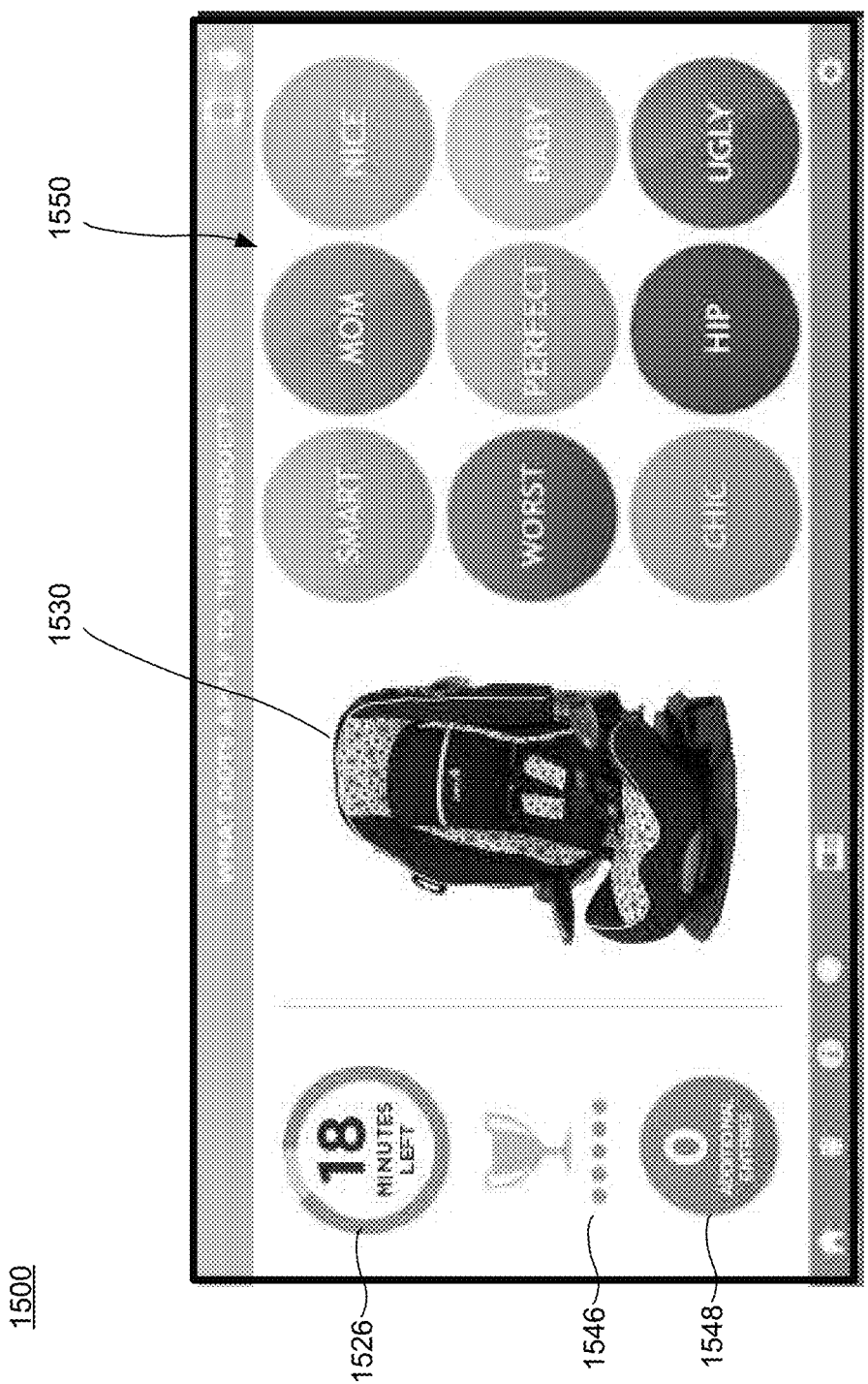
FIG. 15 illustrates an exemplary screen image that enables a user to associate or apply a number of tags or "dots" to the preferred product selected by the user, in accordance with a representative embodiment of the present invention.

FIG. 15 illustrates an exemplary screen image 1500 that enables a user to associate or apply a number of tags or "dots" to the preferred product selected by the user, in accordance with a representative embodiment of the present invention. As illustrated in FIG. 15, the screen image 1500 includes a representation of the preferred product 1530 selected by the user from products of a user-selected category of products. The illustration of FIG. 15 also includes a set of tags or "dots" 1550 to be applied or associated by the user with the preferred product 1530. The user may choose to apply or associate a given tag or "dot" by, for example, tapping upon the image of the selected "dot" displayed on a touch-sensitive surface of a display of a user device. A different set of "dots" or tags may be displayed, in response to a specific user action such as, for example, shaking of the user device or application of a particular gesture of the fingers of the user upon a touch-sensitive display. An indicator such as the user interface element 1546 may represent user progress in associating or applying tags or "dots" to the user-selected product 1530. Upon selecting a certain number of tags or "dots," the user may be awarded an additional entry in the sweepstakes, and the current number of additional entries awarded to the user may be shown by an "Additional Entrees" user interface element 1548. The illustration of FIG. 15 also includes time information 1526, to keep the user informed of the amount of time remaining in the consumer game session.

Figure 16:
FIG. 16 illustrates an exemplary screen image showing user-association or application of a tag or "dot" to the user-selected product selected by the user, in accordance with a representative embodiment of the present invention.

FIG. 16 illustrates an exemplary screen image 1600 showing user-association or application of a tag or "dot" 1652 to the user-selected product 1630 selected by the user, in accordance with a representative embodiment of the present invention. As illustrated in FIG. 16, the screen image 1600 includes a representation of the user-selected/preferred product 1630 that was selected as described above by the user from products of a user-selected category of products, and which may correspond to the user-selected product 1530 of FIG. 15. The illustration of FIG. 16 also includes a set of tags or "dots" 1650 to be applied or associated by the user with the preferred product 1530, showing the absence of the tag or "dot" 1652 associated by the user with the user-selected product 1630. An indicator such as the user interface element 1646 may represent user progress in associating or applying tags or "dots" to the user-selected product 1630. Upon selecting a certain number of tags or "dots," the user may be awarded an additional entry in the sweepstakes, and the current number of additional entries awarded to the user may be shown by an "Additional Entrees" user interface element 1648. The illustration of FIG. 16 also includes time information 1626, to keep the user informed of the amount of time remaining in the consumer game session, in accordance with a representative embodiment of the present invention.

Figure 17:
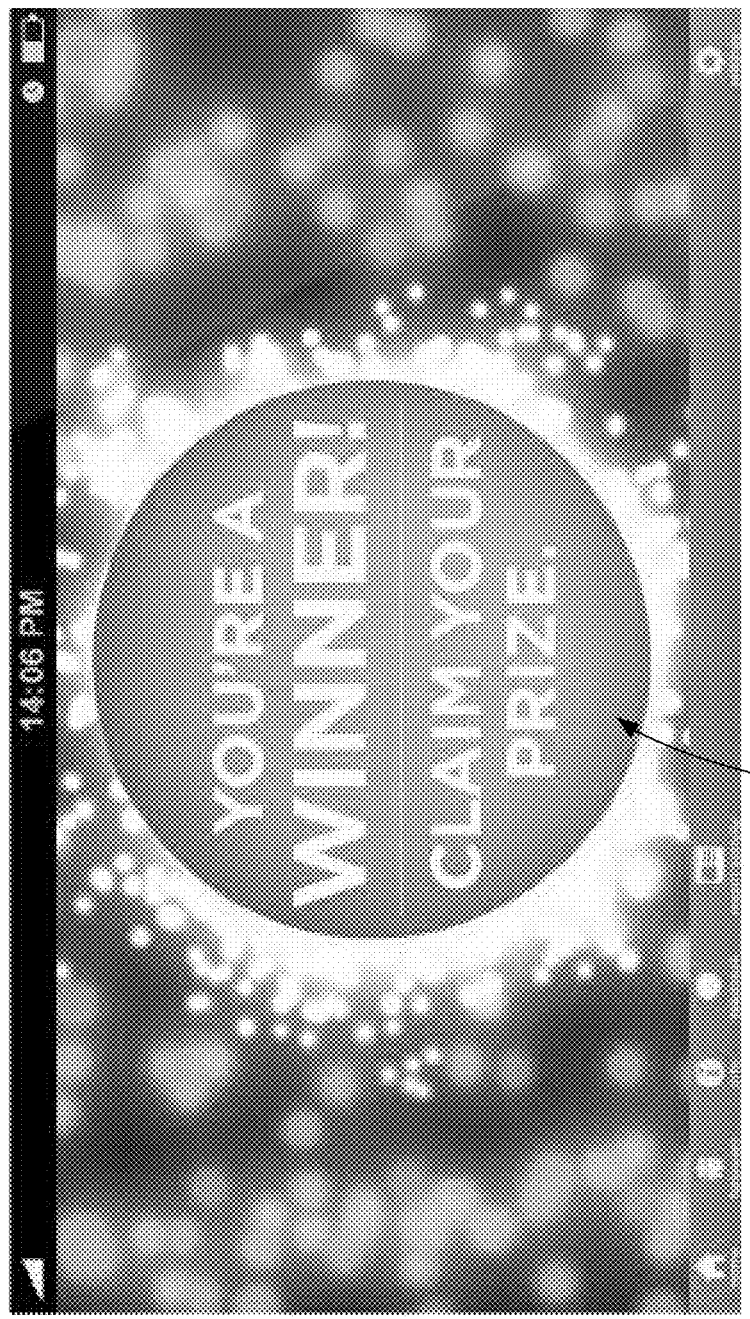
FIG. 17 illustrates an exemplary screen image including a notification message displayed after the consumer game session has ended, informing the user that the user has won the sweepstakes for which he/she was awarded entries during the playing of the consumer game, in accordance with a representative embodiment of the present invention.

FIG. 17 illustrates an exemplary screen image 1700 including a notification message 1754 displayed after the consumer game session has ended, informing the user that the user has won the sweepstakes for which he/she was awarded entries during the playing of the consumer game, in accordance with a representative embodiment of the present invention.

Figure 18:
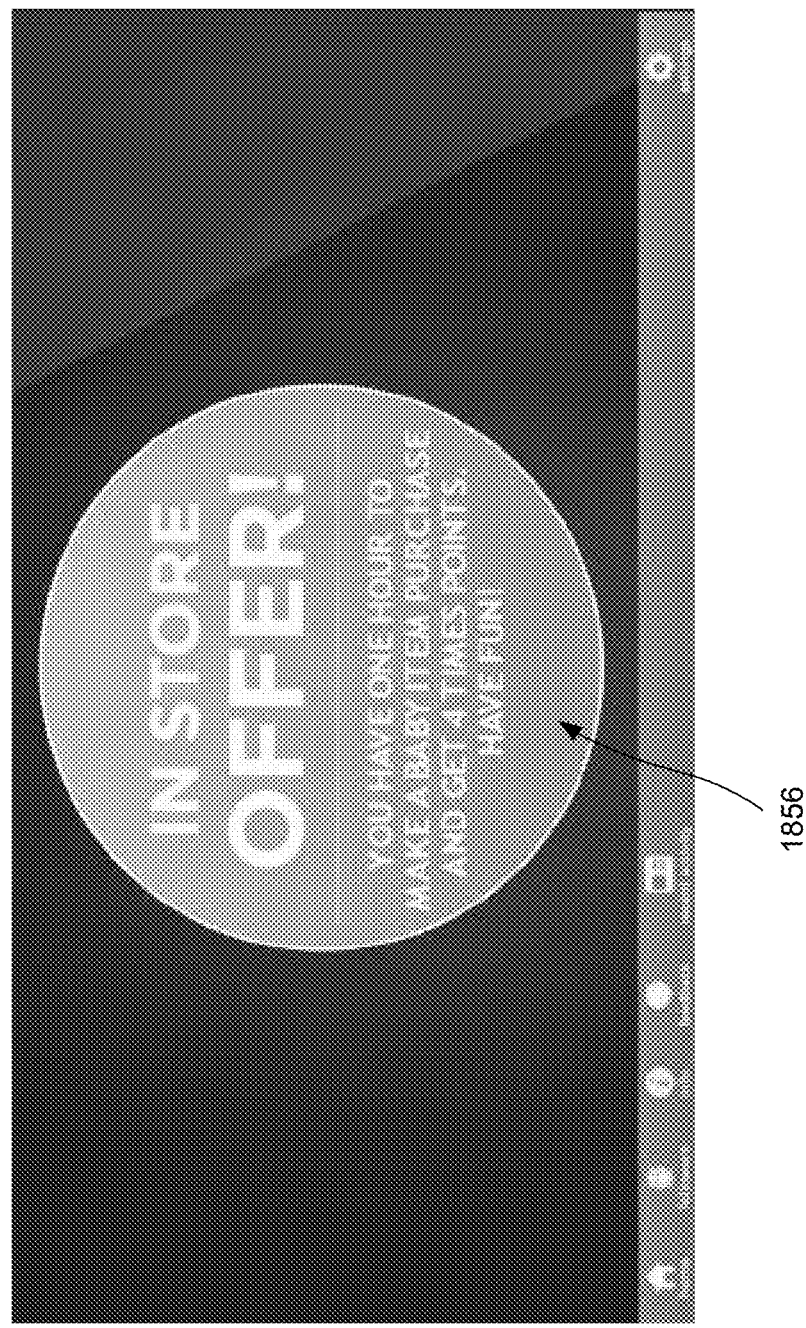
FIG. 18 illustrates an exemplary screen image including a notification message that may be used to inform a participant in the consumer game of an offer made to all participants following completion of the consumer game session, in accordance with a representative embodiment of the present invention.

FIG. 18 illustrates an exemplary screen image 1800 including a notification message 1856 that may be used to inform a participant in the consumer game of an offer made to all participants following completion of the consumer game session, in accordance with a representative embodiment of the present invention. In a representative embodiment of the present invention, any offer made to the participant may be limited to redemption for purchase of a product and/or service in the category selected by the participant at the beginning of the consumer game.

Figure 19:
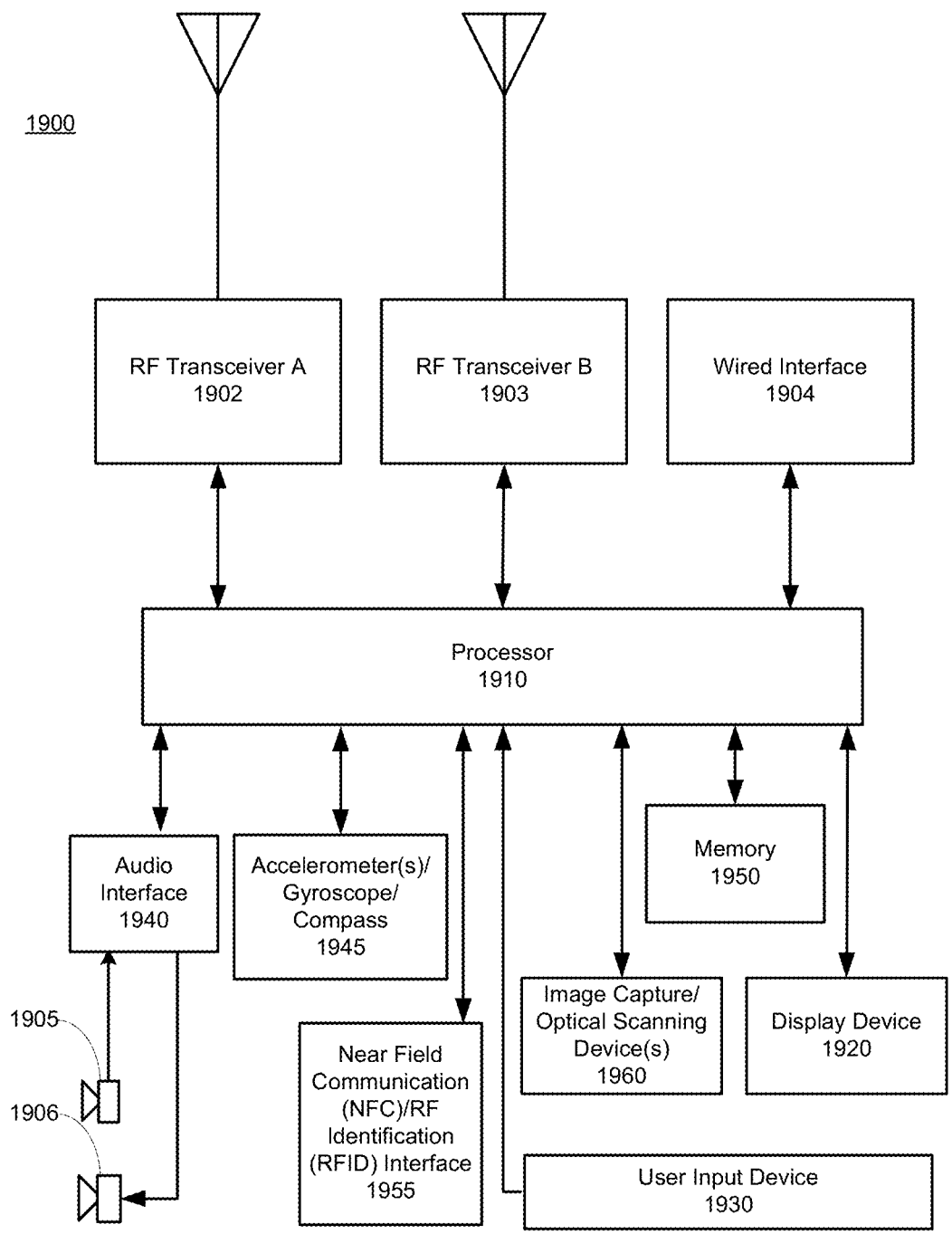
FIG. 19 is a block diagram illustrating a personal electronic device that may correspond, for example, to electronic devices shown in FIG. 1, in accordance with a representative embodiment of the present invention.

FIG. 19 is a block diagram illustrating a personal electronic device 1900 that may correspond, for example, to electronic devices 20', 20', 20" shown in FIG. 1, in accordance with a representative embodiment of the present invention. The personal electronic device 1900 may correspond to electronic user devices such as, by way of example and not limitation, a smart phone, a tablet computer, a cellular phone, a media player, a handheld personal computer, a laptop, a notebook computer, a netbook computer, a desktop computer, a television, or any other suitable electronic device having the functionality discussed herein.

As shown in FIG. 19, the personal electronic device 1900 includes a processor 1910, an RF transceiver A 1902, an RF transceiver B 1903, a wired interface 1904, a display device 1920, a user input device 1930, an audio interface 1940, and a memory 1950. The processor 1910 may be, for example, a suitable microprocessor or microcomputer having sufficient computing power to control the personal electronic device 1900, and is operably coupled to the RF transceiver A 1902, the RF transceiver B 1903, and the wired interface 1904. The RF transceiver A 1902 and RF transceiver B 1903 may comprise any necessary circuitry, logic, and software/firmware for wireless communication over any of, for example, the cellular, Bluetooth, Wi-Fi (e.g., IEEE 802.11 a/b/g/n/ac), Zigbee, WiMAX, or any other wireless network known now or in the future. The wired interface 1904 may comprise any necessary circuitry, logic, and software/firmware for wired communication over any of, for example, an Ethernet, Universal Serial Bus, FireWire (IEEE 1394) or other wired networks known now or in the future.

The processor 1910 is also operably coupled to the memory 1950, and may be used for non-transitory storage of executable program instructions, parameters, and data for any of the circuitry of the personal electronic device 1900. The display device 1920 is also operably coupled to the processor 1910, and may comprise, for example, one or more LED, OLED, LCD, or other form of visual display capable of presenting text or graphics, and may comprise any circuitry, logic, or software/firmware to support, for example, a graphical user interface (GUI). The user input device 1930 may comprise, for example, suitable switches, buttons, or touch sensitive surfaces to enable user control and operation of the personal electronic device 1900, and may comprise any necessary circuitry, logic, and software/firmware to allow it to perform those functions. In a representative embodiment of the present invention, the user input device 1930 may be a touch sensitive surface at the viewing side of the display device 1920, enabling a user to use the touch sensitive surface of the display device to enter user inputs and respond to displayed information. The audio interface 1940 comprises any necessary circuitry, logic, and software to interface a microphone 1905 and a speaker 1906 to the processor 1910.

Aspects of the present invention may be seen in a method of operating a system supporting participation by a plurality of consumers in a consumer game session having a certain duration. Such a method comprising establishing a repository of personal information for each of the plurality of consumers; receiving input representing a request to participate in the consumer game, from one consumer of the plurality of consumers; and presenting a plurality of product categories to the one consumer, based upon an analysis of the personal information of the one consumer. The method may also comprise receiving input representing selection by the one consumer of one of the plurality of product categories; presenting, to the one consumer, information identifying a plurality of products in the product category selected by the one consumer; and awarding an initial entry in a sweepstakes to the one consumer, in response to identification, by the one consumer, of a preferred product of the plurality of products. The method may further comprise notifying a winner from all entries in the sweepstakes, upon completion of the certain duration of the consumer game session.

In a representative embodiment of the present invention, the analysis may determine whether at least one deficiency in the personal information of the one consumer exists, and the personal information may comprise information representing a social graph of the one consumer. The analysis may determine whether at least one deficiency in social graph information/personal profile of the one consumer exists. The one consumer may participate in the consumer game session using one of a cellular telephone, a smart phone, and a tablet computer. The consumer game session may be a common interval of time during which all participating consumers of the plurality of consumers engage in activities of the consumer game.

In some representative embodiments of the present invention, the method may further comprise awarding an additional entry in the sweepstakes, upon determining that the one consumer has captured product identification information from the preferred product of the plurality of products while at an in-store location of a merchant using a personal device of the one consumer. The product identification information captured from the preferred product using the personal device of the one consumer may comprise one of an optical code and a code received using a radio frequency signal, and the personal information of the one consumer may comprise information about one or more members of a social network of the one consumer.

In a representative embodiment of the present invention, the method may further comprise presenting a set of product characteristics selected from characteristics associated with the collection of products, to the one consumer; receiving, from the one consumer, input associating one or more characteristics from the set of product characteristics with the preferred product; and awarding an additional entry in the sweepstakes, upon determining that input associating at least a certain number of new characteristics from the set of product characteristics has been received from the one consumer. The characteristics associated with the collection of products may comprise characteristics associated with the products of the collection of products by the plurality of consumers. The method may also comprise updating information about the preferred product to enable reporting of trends associated with product interactions with the plurality of consumers.

Additional aspects of the present invention may be found in a system supporting participation by a plurality of consumers in a consumer game session having a certain duration. Such a system may comprise at least one processor for communicatively coupling to user devices of the plurality of consumers, wherein the at least one processor is operable to perform the method described above.

Yet other aspects of the present invention may be observed in a non-transitory computer-readable medium having a plurality of code sections, where each code section comprises a plurality of instructions executable by one or more processors to perform actions of the method described above.

Although devices, methods, and systems according to the present invention may have been described in connection with a preferred embodiment, it is not intended to be limited to the specific form set forth herein, but on the contrary, it is intended to cover such alternative, modifications, and equivalents, as can be reasonably included within the scope of the invention as defined by this disclosure and appended diagrams.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, comprising:
   establishing a repository of personal information for each of the plurality of consumers;
   receiving input representing a request to participate in the consumer game from a graphical user interface used by one consumer of the plurality of consumers;
   causing the graphical user interface to present, to the one consumer, graphical elements representing a plurality of product categories based upon an analysis of the personal information of the one consumer;
   receiving input representing a request for a different set of product categories to be presented on the graphical user interface based on a shaking of a mobile device of the one consumer, wherein the mobile device is structured to affect the presentation on the graphical user interface based on the shaking of the mobile device;
   receiving input representing selection by the one consumer of one of the graphical elements of the graphical user interface representing one of the plurality of product categories, wherein the selection is made via a physical touch of a touch sensitive screen of a user device;
   causing the graphical user interface to present, to the one consumer, information identifying a plurality of products in the product category selected by the one consumer;
   causing the graphical user interface to provide an initial entry in a sweepstakes to the one consumer, in response to an identification, via selecting one of the graphical elements of the graphical user interface by the one consumer, of a preferred product of the plurality of products;
   causing the graphical user interface to present, to the one consumer, the graphical elements including a plurality of icons related to the preferred product, wherein the plurality of icons include descriptions of the preferred product and are based on a depth of personal information and any detected gaps or deficiencies in the personal information of the one consumer with respect to the preferred product;
   receiving input representing selection by the one consumer of one of the plurality of icons of the graphical user interface that represents a relationship of the one consumer with respect to the preferred product;
   providing one or more entries to the one consumer for performing particular tasks via a camera of the mobile device, comprising:
      receiving geographic location information via the mobile phone;
      requesting performance of one or more of the particular tasks, via the mobile phone, when the one consumer is at a particular geographic location within a particular store,
         wherein the one or more of the particular tasks comprises finding a particular product at the particular geographic location in the particular store, wherein maps or layouts of the particular store are provided, wherein directions or routes within the particular store are determined, and
         wherein the one or more of the particular tasks comprises scanning, via the camera of the mobile device, a code attached to or associated with the particular product; and
      receiving, via a wireless transceiver of the mobile phone, information indicating that the code has been scanned by the mobile device; and
   causing the graphical user interface to notify a winner from all entries in the sweepstakes, upon completion of the certain duration of the consumer game session.

2. The method according to claim 1, wherein the analysis determines whether at least one deficiency in the personal information of the one consumer exists.

3. The method according to claim 1, wherein the personal information comprises information representing a social graph of the one consumer.

4. The method according to claim 1, wherein the analysis determines whether at least one deficiency in social graph information of the one consumer exists.

5. The method according to claim 1, wherein the one consumer makes the selection of one of the plurality of icons in the consumer game session by physically interacting with a touch-sensitive screen one of a cellular telephone, a smart phone, and a tablet computer.

6. The method according to claim 1, wherein the consumer game session is a common interval of time during which all participating consumers of the plurality of consumer engage in activities of the consumer game, and wherein the winner is notified on the user device upon the completion of the common interval of time.

7. The method according to claim 1, further comprising:
   awarding an additional entry in the sweepstakes, upon determining that the one consumer has captured product identification information from the preferred product of the plurality of products while at an in-store location of a merchant using a personal device of the one consumer.

8. The method according to claim 1, wherein the product identification information captured from the preferred product using the personal device of the one consumer comprises one of an optical code and a code received using a radio frequency signal.

9. The method according to claim 1, wherein the personal information of the one consumer comprises information about one or more members of a social network of the one consumer that is used in presenting the plurality of product categories to the one consumer.

10. The method according to claim 1, the method further comprising:

presenting a set of product characteristics selected from characteristics associated with the collection of products, to the one consumer;

receiving, from the one consumer, input associating one or more characteristics from the set of product characteristics with the preferred product; and awarding an additional entry in the sweepstakes, upon determining that input associating at least a certain number of new characteristics from the set of product characteristics has been received from the one consumer.

11. The method according to claim 10, wherein the characteristics associated with the collection of products comprise characteristics associated with the products of the collection of products by the plurality of consumers, and wherein the one consumer provides the input that associates the one or more characteristics with the preferred product.

12. The method according to claim 1, wherein the method further comprises:

updating information about the preferred product to report trends associated with product interactions with the plurality of consumers.

13. A system, comprising:

at least one processor for communicatively coupling to user devices of the plurality of consumers, wherein the at least one processor is operable to, at least:

establish a repository of personal information for each of the plurality of consumers;

receive input representing a request to participate in the consumer game from a graphical user interface used by one consumer of the plurality of consumers;

cause the graphical user interface to present, to the one consumer, graphical elements representing a plurality of product categories based upon an analysis of the personal information of the one consumer;

receive input representing a request for a different set of product categories to be presented on the graphical user interface based on a shaking of a mobile device of the one consumer, wherein the mobile device is structured to affect the presentation on the graphical user interface based on the shaking of the mobile device;

receive input representing selection by the one consumer of one of the graphical elements of the graphical user interface representing one of the plurality of product categories;

cause the graphical user interface to present, to the one consumer, information identifying a plurality of products in the product category selected by the one consumer;

cause the graphical user interface to provide an initial entry in a sweepstakes to the one consumer, in response to an identification, via selecting one of the graphical elements of the graphical user interface by the one consumer, of a preferred product of the plurality of products;

cause the graphical user interface to present, to the one consumer, the graphical elements including a plurality of icons related to the preferred product, wherein the plurality of icons include descriptions of the preferred product and are based on a depth of a personal information and any detected gaps or deficiencies in the personal information of the one consumer with respect to the preferred product;

receive input representing selection by the one consumer of one of the plurality of icons of the graphical user interface that represents a relationship of the one consumer with respect to the preferred product;

provide one or more entries to the one consumer for performing particular tasks via a camera of the mobile device, comprising:

receive geographic location information via the mobile phone;

request performance of one or more of the particular tasks, via the mobile phone, when the one consumer is at a particular geographic location within a particular store, wherein the one or more of the particular tasks comprises finding a particular product at the particular geographic location in the particular store, wherein maps or layouts of the particular store are provided, wherein directions or routes within the particular store are determined, and wherein the one or more of the particular tasks comprises scanning, via the camera of the mobile device, a code attached to or associated with the particular product; and receive, via a wireless transceiver of the mobile phone, information indicating that the code has been scanned by the mobile device; and causing the graphical user interface to notify a winner from all entries in the sweepstakes, upon completion of the certain duration of the consumer game session.

14. The system according to claim 13, wherein the analysis determines whether at least one deficiency in the personal information of the one consumer exists.

15. The system according to claim 13, wherein the personal information comprises information representing a social graph of the one consumer that is used to present the plurality of product categories to the one consumer.

16. The system according to claim 13, wherein the analysis determines whether at least one deficiency in social graph information of the one consumer exists.

17. The system according to claim 13, wherein the one consumer makes the selection of one of the plurality of icons in the consumer game session by physically interacting with a touch-sensitive screen of one of a cellular telephone, a smart phone, and a tablet computer.

18. The system according to claim 13, wherein the consumer game session is a common interval of time during which all participating consumers of the plurality of consumer engage in activities of the consumer game, and wherein the winner is notified on the user device in the sweepstakes upon the completion of the common interval of time.

19. The system according to claim 13, wherein the at least one processor is operable to, at least:

award an additional entry in the sweepstakes, upon determining that the one consumer has captured product identification information from the preferred product of the plurality of products while at an in-store location of a merchant using a personal device of the one consumer.

20. The system according to claim 13, wherein the product identification information captured from the preferred product using the personal device of the one consumer comprises one of an optical code and a code received using a radio frequency signal.

21. The system according to claim 13, wherein the personal information of the one consumer comprises information about one or more members of a social network of the one consumer that is used in presenting the plurality of product categories to the one consumer.

22. The system according to claim 13, wherein the at least one processor is operable to, at least:

present a set of product characteristics selected from characteristics associated with the collection of products, to the one consumer;

receive, from the one consumer, input associating one or more characteristics from the set of product characteristics with the preferred product; and award an additional entry in the sweepstakes, upon determining that input associating at least a certain number of new characteristics from the set of product characteristics has been received from the one consumer.

23. The system according to claim 22, wherein the characteristics associated with the collection of products comprise characteristics associated with the products of the collection of products by the plurality of consumers, and wherein the one consumer provides the input that associates the one or more characteristics with the preferred product.

24. A non-transitory computer-readable medium having a plurality of code sections, each code section comprising a plurality of instructions executable by one or more processors to perform actions that support participation by a plurality of consumers in a consumer game session having a certain duration, the actions of the one or more processors comprising:

establishing a repository of personal information for each of the plurality of consumers;

receiving input representing a request to participate in the consumer game from a graphical user interface used by one consumer of the plurality of consumers;

causing the graphical user interface to present, to the one consumer, a plurality of product categories based upon an analysis of the personal information of the one consumer;

receiving input representing a request for a different set of product categories to be presented on the graphical user interface based on a shaking of a mobile device of the one consumer, wherein the mobile device is structured to affect the presentation on the graphical user interface based on the shaking of the mobile device;

receiving input representing selection by the one consumer of one of the graphical elements of the graphical user interface representing one of the plurality of product categories;

causing the graphical user interface to present, to the one consumer, information identifying a plurality of products in the product category selected by the one consumer;

causing the graphical user interface to provide an initial entry in a sweepstakes to the one consumer, in response to an identification, via selecting one of the graphical elements of the graphical user interface by the one consumer, of a preferred product of the plurality of products;

causing the graphical user interface to present, to the one consumer, the graphical elements including a plurality of icons related to the preferred product, wherein the plurality of icons include descriptions of the preferred product and are based on a depth of personal information and any detected gaps or deficiencies in the personal information of the one consumer with respect to the preferred product;

receiving input representing selection by the one consumer of one of the plurality of icons of the graphical user interface that represents a relationship of the one consumer with respect to the preferred product;

providing one or more entries to the one consumer for performing particular tasks via a camera of the mobile device, comprising:

receiving geographic location information via the mobile phone;

requesting performance of one or more of the particular tasks, via the mobile phone, when the one consumer is at a particular geographic location within a particular store, wherein the one or more of the particular tasks comprises finding a particular product at the particular geographic location in the particular store, wherein maps or layouts of the particular store are provided, wherein directions or routes within the particular store are determined, and wherein the one or more of the particular tasks comprises scanning, via the camera of the mobile device, a code attached to or associated with the particular product; and receiving, via a wireless transceiver of the mobile phone, information indicating that the code has been scanned by the mobile device; and causing the graphical user interface to notify a winner from all entries in the sweepstakes, upon completion of the certain duration of the consumer game session.

25. The non-transitory computer-readable medium according to claim 24, wherein the analysis determines whether at least one deficiency in the personal information of the one consumer exists.

26. The non-transitory computer-readable medium according to claim 24, wherein the personal information comprises information representing a social graph of the one consumer.

27. The non-transitory computer-readable medium according to claim 24, wherein the analysis determines whether at least one deficiency in social graph information of the one consumer exists.

28. The non-transitory computer-readable medium according to claim 24, wherein the one consumer makes the selection of one of the plurality of icons in the consumer game session by physically interacting with a touch-sensitive screen one of a cellular telephone, a smart phone, and a tablet computer.

29. The non-transitory computer-readable medium according to claim 24, wherein the consumer game session is a common interval of time during which all participating consumers of the plurality of consumer engage in activities of the consumer game, and wherein the winner is notified on the user device upon the completion of the common interval of time.

30. The non-transitory computer-readable medium according to claim 24, wherein the actions of the one or more processors comprise:

awarding an additional entry in the sweepstakes, upon determining that the one consumer has captured product identification information from the preferred product of the plurality of products while at an in-store location of a merchant using a personal device of the one consumer.

31. The non-transitory computer-readable medium according to claim 24, wherein the product identification information captured from the preferred product using the personal device of the one consumer comprises one of an optical code and a code received using a radio frequency signal.

32. The non-transitory computer-readable medium according to claim 24, wherein the personal information of the one consumer comprises information about one or more members of a social network of the one consumer that is used in presenting the plurality of product categories to the one consumer.

33. The non-transitory computer-readable medium according to claim 24, wherein the actions of the one or more processors comprise:
   presenting a set of product characteristics selected from characteristics associated with the collection of products, to the one consumer;
   receiving, from the one consumer, input associating one or more characteristics from the set of product characteristics with the preferred product; and
   awarding an additional entry in the sweepstakes, upon determining that input associating at least a certain number of new characteristics from the set of product characteristics has been received from the one consumer.

34. The non-transitory computer-readable medium according to claim 33, wherein the characteristics associated with the collection of products comprise characteristics associated with the products of the collection of products by the plurality of consumers, and wherein the one consumer provides the input that associates the one or more characteristics with the preferred product.

35. The method according to claim 1, comprising:
   limiting the participants of the consumer game to a particular geographic area; and
   offering a prize of the sweepstakes that is based on at least a number of participants.

* * * * *